United States Patent
Rao et al.

(10) Patent No.: US 8,522,251 B2
(45) Date of Patent: Aug. 27, 2013

(54) ORGANIZING TASK PLACEMENT BASED ON WORKLOAD CHARACTERIZATIONS

(75) Inventors: Bharata B. Rao, Bangalore (IN); Vaidyanathan Srinivasan, Bangalore (IN); Vaddagiri Srivatsa, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 279 days.

(21) Appl. No.: 12/987,216

(22) Filed: Jan. 10, 2011

(65) Prior Publication Data

US 2012/0180061 A1 Jul. 12, 2012

(51) Int. Cl.
*G06F 9/46* (2006.01)

(52) U.S. Cl.
USPC .......................................... 718/105; 718/101

(58) Field of Classification Search
None
See application file for complete search history.

(56) References Cited

U.S. PATENT DOCUMENTS

| | | | | |
|---|---|---|---|---|
| 6,681,297 | B2 * | 1/2004 | Chauvel et al. | 711/130 |
| 7,149,801 | B2 * | 12/2006 | Burrows et al. | 709/225 |
| 7,194,517 | B2 * | 3/2007 | Conway et al. | 709/212 |
| 2006/0168571 | A1 | 7/2006 | Ghiasi et al. | |
| 2008/0177756 | A1 | 7/2008 | Kosche et al. | |
| 2009/0132769 | A1 | 5/2009 | Pronovost et al. | |
| 2009/0183167 | A1 * | 7/2009 | Kupferschmidt et al. | 718/104 |
| 2009/0187713 | A1 | 7/2009 | Zedlewski et al. | |
| 2010/0023645 | A1 * | 1/2010 | Foygel et al. | 709/232 |
| 2012/0072627 | A1 * | 3/2012 | Droux et al. | 710/104 |

OTHER PUBLICATIONS

Zhou et al., "Cache Sharing Management for Performance Fairness in Chip Multiprocessors", IEEE, 2009 18th International Conference on Parallel Architectures and Compilation Techniques, pp. 384-393.
Moseley et al., "Dynamic Run-time Architecture Techniques for Enabling Continuous Optimization", CF'05, May 2005, Ischia, Italy, ACM, pp. 211-220.
Singh et al., "Real Time Power Estimation and Thread Scheduling via Performance Counters", ACM SIGARCH Computer Architecture News, vol. 37, No. 2, May 2009, pp. 46-55.
Anderson et al., "Real-Time Scheduling on Multicore Platforms", Proc. of the 12th IEEE Real-Time and Embedded Technology and Applications Symposium, (RTAS'06), Washington, DC, USA, 2006, pp. 1-31.
Chew, "Memory Placement Optimization (MPO)", Solaris Kernel Performance Sun Microsystems, Jul. 12, 2006, pp. 1-49. opensolaris.org/os/community/performance/numa/mpo_update.pdf, Jul. 2006.
Fedorova, "Operating System Scheduling for Chip Multithreaded Processors", PhD thesis, Division of Engineering and Applied Sciences, Harvard University, Cambridge, MA, Sep. 2006, pp. 1-199.
Fedorova et al., "A Non-Work-Conserving Operating System Scheduler for SMT Processors", Proc. of the USENIX 2005 Annual Technical Conference, Anaheim, CA, Apr. 2005, pp. 1-8.
Parekh et al., "Thread-Sensitive Scheduling for SMT Processors", University of Washington Technical Report, Apr. 2, 2000, pp. 1-18.

* cited by examiner

*Primary Examiner* — Camquy Truong
(74) *Attorney, Agent, or Firm* — Yee & Associates, P.C.; Daniel H. Schnurmann

(57) ABSTRACT

Task placement is influenced within a multiple processor computer. Tasks are classified as either memory bound or CPU bound by observing certain performance counters over the task execution. During a first pass of task load balance, tasks are balanced across various CPUs to achieve a fairness goal, where tasks are allocated CPU resources in accordance to their established fairness priority value. During a second pass of task load balance, tasks are rebalanced across CPUs to reduce CPU resource contention, such that the rebalance of tasks in the second pass does not violate fairness goals established in the first pass. In one embodiment, the second pass could involve re-balancing memory bound tasks across different cache domains, where CPUs in a cache domain share a same last mile CPU cache such as an L3 cache. In another embodiment, the second pass could involve re-balancing CPU bound tasks across different CPU domains of a cache domain, where CPUs in a CPU domain could be sharing some or all of CPU execution unit resources. The two passes could be executed at different frequencies.

20 Claims, 13 Drawing Sheets

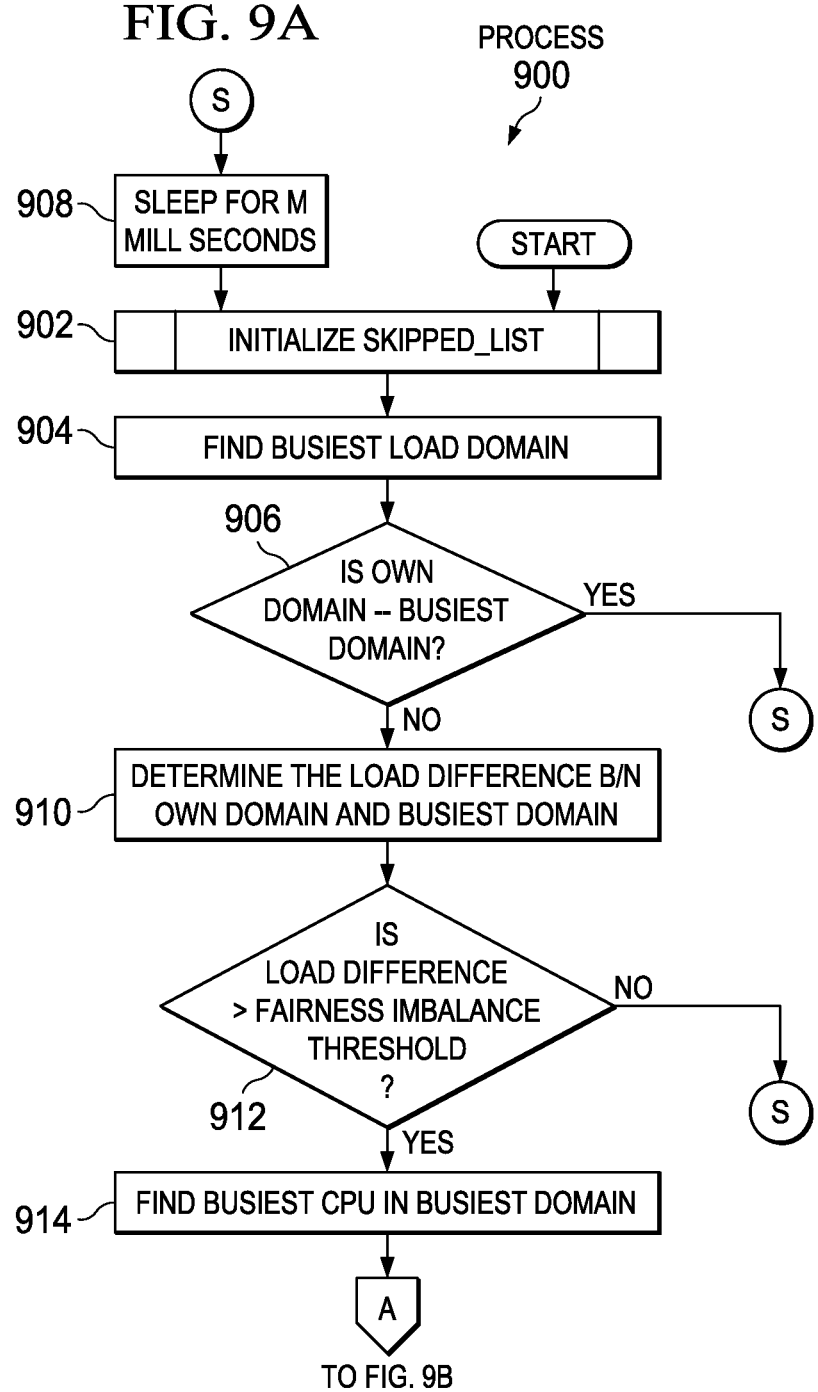

ORGANIZING TASK PLACEMENT BASED ON WORKLOAD CHARACTERIZATIONS

BACKGROUND

1. Field

The disclosure relates generally to a computer implemented method, a computer program product, and a data processing system. More specifically, the disclosure relates to a computer implemented method, a computer program product, and a data processing system for organizing task placement based on workload characterizations.

2. Description of the Related Art

Multiple processor computer systems are those in which more than one processing element or CPU is used to process a given workload. A multiple processor system may have two, four, or more processors within a computer cabinet or in several enclosures connected to form a single processing entity.

Symmetric multiprocessors (SMP) have shared memory that is accessible by all of the processors in the complex. Shared memory enables the task scheduling function of the system to assign a task to the processor that has the necessary resources for that task. Such resources may include input/output devices, such as displays, printers, or communication devices. In a symmetric multiprocessing system, the shared memory environment enables a task to be scheduled on a processor with a certain resource and later rescheduled through the shared memory to a different processor.

SUMMARY

According to one embodiment of the present invention, a computer implemented method influences task placement within a multiple processor computer. Tasks are classified as either memory bound or CPU bound by observing certain performance counters over the task execution. During a first pass of task load balance, tasks are balanced across various CPUs to achieve a fairness goal, where tasks are allocated CPU resources in accordance to their established fairness priority value. During a second pass of task load balance, tasks are rebalanced across CPUs to reduce CPU resource contention, such that the rebalance of tasks in the second pass does not violate fairness goals established in the first pass. In one embodiment, the second pass could involve re-balancing memory bound tasks across different cache domains, where CPUs in a cache domain share a same last mile CPU cache such as an L3 cache. In another embodiment, the second pass could involve re-balancing CPU bound tasks across different CPU domains of a cache domain, where CPUs in a CPU domain could be sharing some or all of CPU execution unit resources. The two passes could be executed at different frequencies.

BRIEF DESCRIPTION OF THE SEVERAL VIEWS OF THE DRAWINGS

FIGS. 9A-9B are flowcharts for optimizing task placement during runtime in accordance with an illustrative embodiment;

DETAILED DESCRIPTION

Figure 1:
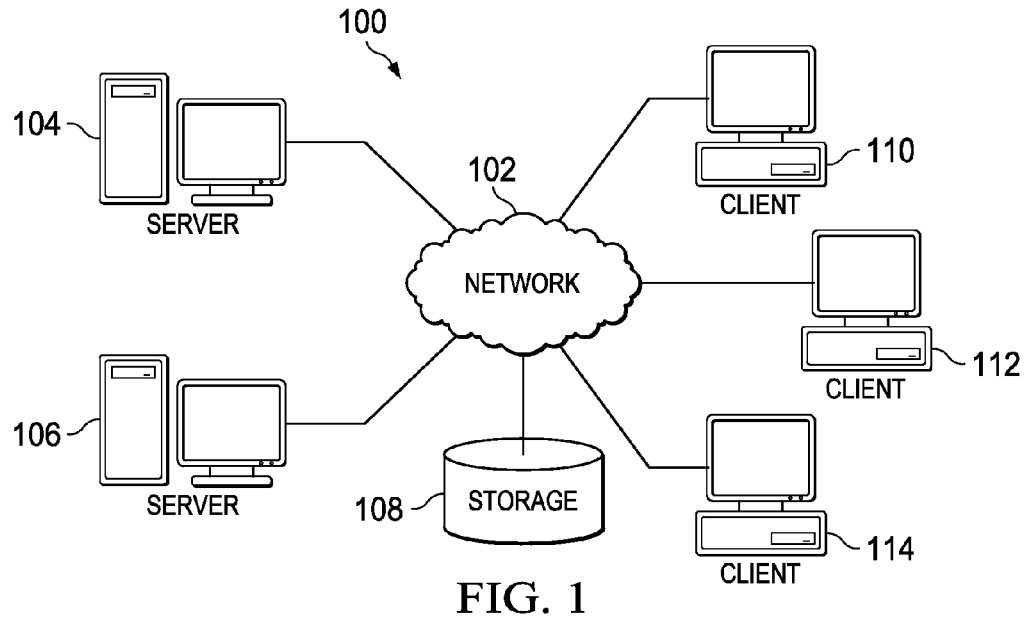
FIG. 1 is an illustrative diagram of a data processing environment in which illustrative embodiments may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures and in particular with reference to FIG. 1, an illustrative diagram of a data processing environment is provided in which illustrative embodiments may be implemented. It should be appreciated that FIG. 1 is only provided as an illustration of one implementation and is not intended to imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communication links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers 110, 112, and 114 connect to network 102. Client computers 110, 112, and 114 may be, for example, personal computers or network computers. In the depicted example, server computer 104 provides information, such as boot files, operating system images, and applications to client computers 110, 112, and 114. Client computers 110, 112, and 114 are clients to server computer 104 in this example. Network data processing system 100 may include additional server computers, client computers, and other devices not shown.

Program code located in network data processing system 100 may be stored on a computer recordable storage medium and downloaded to a data processing system or other device for use. For example, program code may be stored on a computer recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

Figure 2:
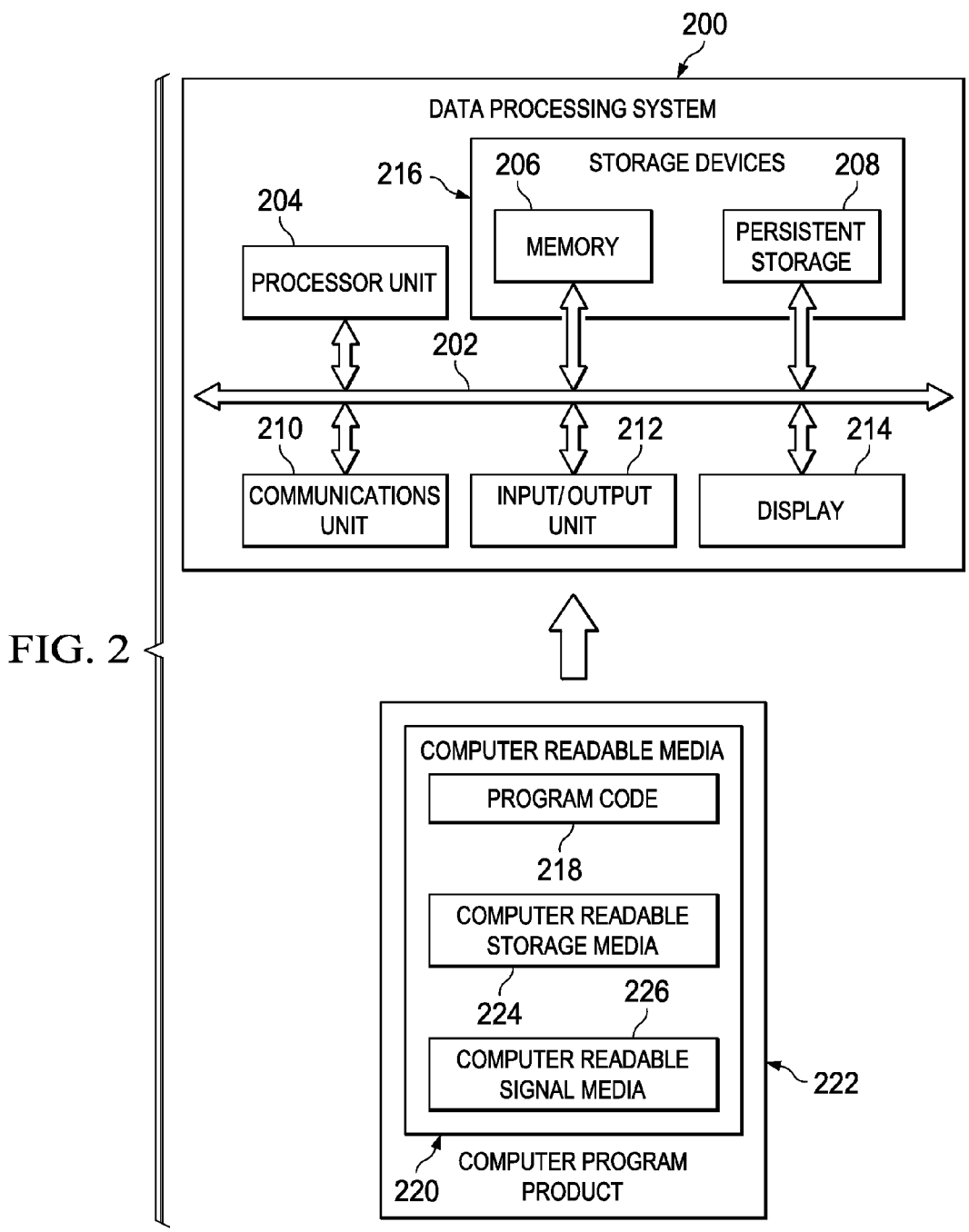
FIG. 2 is an illustration of a data processing system in accordance with an illustrative embodiment.

Turning now to FIG. 2, an illustration of a data processing system is depicted in accordance with an illustrative embodiment. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a number of processors, a multi-processor core, or some other type of processor, depending on the particular implementation. A number, as used herein with reference to an item, means one or more items. Further, processor unit 204 may be implemented using a number of heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Storage devices 216 may also be referred to as computer readable storage devices in these examples. Memory 206, in these examples, may be, for example, a random access memory or any other suitable volatile or non-volatile storage device. Persistent storage 208 may take various forms, depending on the particular implementation.

For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or computer readable storage media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be computer readable storage media 224 or computer readable signal media 226. Computer readable storage media 224 may include, for example, an optical or magnetic disk that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory, that is connected to data processing system 200. In some instances, computer readable storage media 224 may not be removable from data processing system 200. In these illustrative examples, computer readable storage media 224 is a non-transitory computer readable storage medium.

Alternatively, program code 218 may be transferred to data processing system 200 using computer readable signal media 226. Computer readable signal media 226 may be, for example, a propagated data signal containing program code 218. For example, computer readable signal media 226 may be an electromagnetic signal, an optical signal, and/or any other suitable type of signal. These signals may be transmitted over communication links, such as wireless communication links, optical fiber cable, coaxial cable, a wire, and/or any other suitable type of communications link. In other words, the communications link and/or the connection may be physical or wireless in the illustrative examples.

In some illustrative embodiments, program code 218 may be downloaded over a network to persistent storage 208 from another device or data processing system through computer readable signal media 226 for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206, or a cache, such as found in an interface and memory controller hub that may be present in communications fabric 202.

The illustrative embodiments described herein provide a computer implemented method for influencing task placement within a multiple processor computer. Tasks are classified as either memory bound or CPU bound by observing certain performance counters over the task execution. During a first pass of task load balance, tasks are balanced across various CPUs to achieve a fairness goal, where tasks are allocated CPU resources in accordance to their established fairness priority value. During a second pass of task load balance, tasks are rebalanced across CPUs to reduce CPU resource contention, such that the rebalance of tasks in the second pass does not violate fairness goals established in the first pass. In one embodiment, the second pass could involve re-balancing memory bound tasks across different cache domains, where CPUs in a cache domain share a same last mile CPU cache such as an L3 cache. In another embodiment, the second pass could involve re-balancing CPU bound tasks across different CPU domains of a cache domain, where CPU in a CPU domain could be sharing some or all of CPU execution unit resources. The two passes could be executed at different frequencies.

Figure 3:
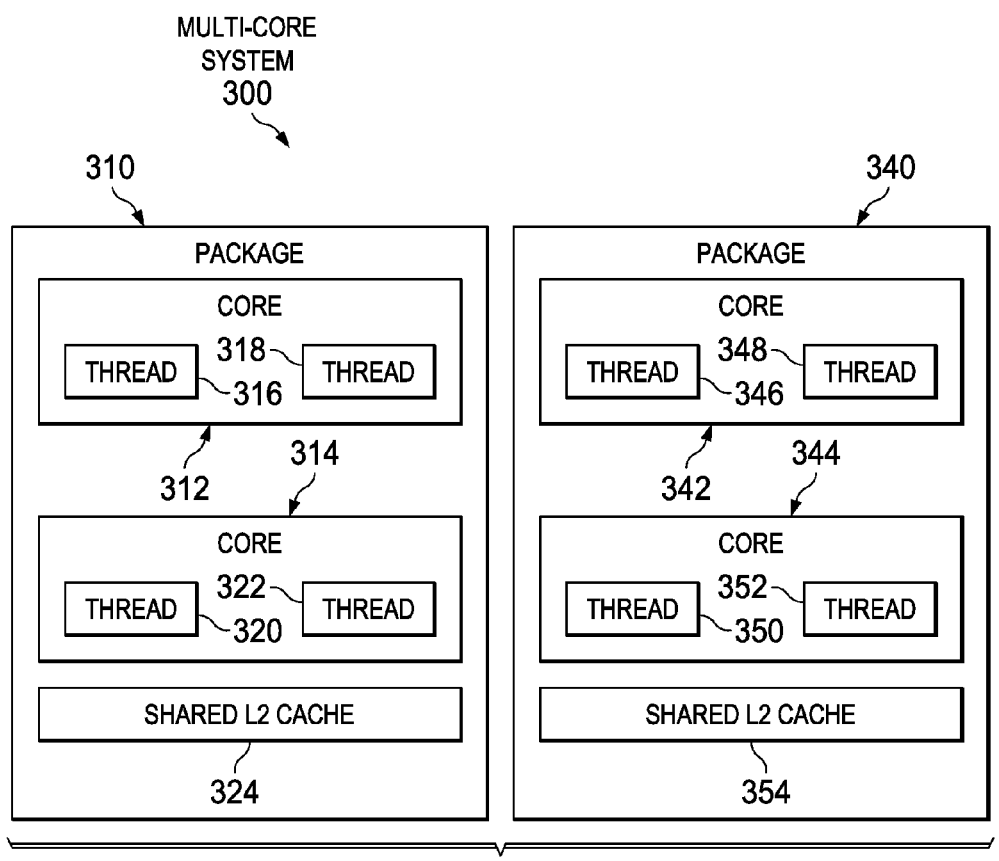
FIG. 3 is a multi-package, multi-core, multi-threaded data processing system according to an illustrative embodiment.

Referring now to FIG. 3, a multi-package, multi-core, multi-threaded data processing system is shown according to an illustrative embodiment. Multi-core system 300 is a data processing system, such as data processing system 200 of FIG. 2.

Multi-core system 300 includes package 310 and package 340. Each of package 310 and package 340 is a physical or logical processing package, including one or more physical or logical cores and a cache shared between those cores.

Package 310 includes core 312 and core 314. Package 340 includes core 342 and core 344. Core 312 and core 314 are the part of package 310 that actually performs reading and executing of instructions. Similarly, core 342 and core 344 are the part of package 340 that actually performs reading and executing of instructions.

Core 312 and core 314 share shared L2 cache 324. Similarly, core 342 and core 344 share shared L2 cache 354. Shared L2 cache 324 is a memory storage associated with core 312 and core 314 that transparently stores data in order to more quickly access requested data. Similarly, shared L2 cache 354 is a memory storage associated with core 342 and core 344. Each of shared L2 cache 324 and shared L2 cache 354 is a smaller, faster memory which stores copies of the data from the most frequently used main memory locations. As long as most memory accesses are cached memory locations, the average latency of memory accesses will be closer to the cache latency than to the latency of main memory.

In an illustrative embodiment, each of shared L2 cache 324 and shared L2 cache 354 is part of a multiple level cache system. Multi-level caches generally operate by checking the smallest Level 1 (L1) cache first. If the requested data is not found in the L1 cache, the next larger Level cache (L2) is checked, and so on, before external memory is checked. L1 caches are typically assigned on a per core basis, so that each of core 312, core 314, core 342, and core 344 would have their own L1 cache. In response to a cache miss in one of the L1 caches, the cores would then check the assigned one of shared L2 cache 324 or shared L2 cache 354.

In multi-core system 300, core 312 and core 314 share shared L2 cache 324. Similarly, core 342 and core 344 share shared L2 cache 354. Thus, core 312 and core 314 are said to be within a same cache-domain. Similarly, core 342 and core 344 are said to be within a same cache-domain, different from the cache-domain of core 312 and core 314.

In multi-core system 300, hardware threads 316 and 318 sharing execution units of core 312 are said to be within a same CPU domain. Similarly, hardware threads 320 and 322 sharing execution units of core 314 are said to be within a same CPU domain.

In multi-core system 300, hardware threads 346 and 348 sharing execution units of core 342 are said to belong to a same CPU domain. Similarly, hardware threads 350 and 352 sharing execution units of core 344 are said to belong to a same CPU domain.

Figure 4:
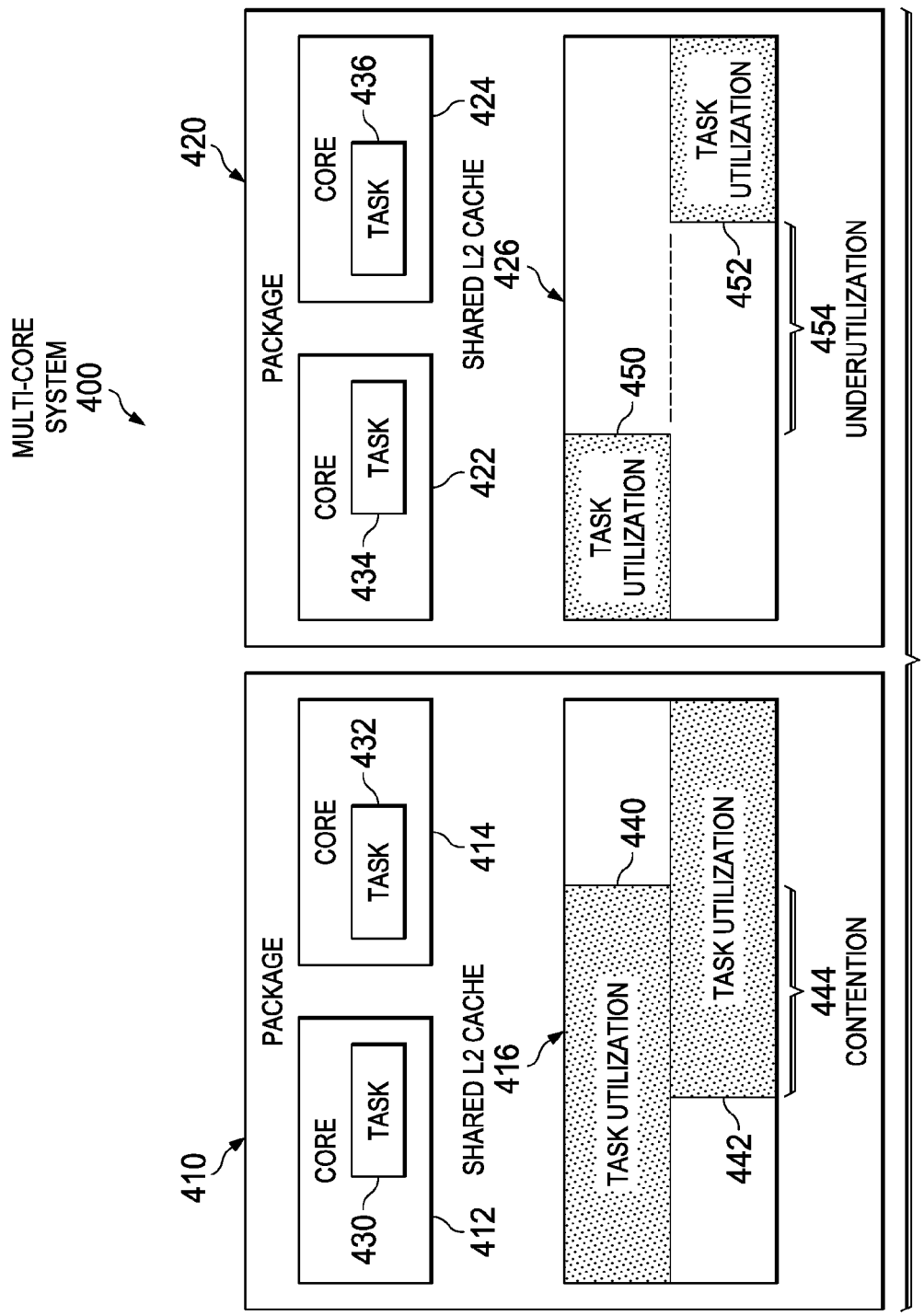
FIG. 4 is a first task placement of tasks on a multi-core data processing system according to an illustrative embodiment.

Referring now to FIG. 4, a first task placement of tasks on a multi-core data processing system is shown according to an illustrative embodiment. Multi-core system 400 is multi-core system 300 of FIG. 3, except that hardware threads within the cores are not shown here explicitly.

Multi-core system 400 includes four tasks: task 430, task 432, task 434, and task 436. Each of task 430, task 432, task 434, and task 436 is a set of program instructions that are loaded in memory. Core 412 executes task 430. Core 414 executes task 432. Core 422 executes task 434. Core 424 executes task 436.

Task 430 and task 432 are memory-hungry tasks. Memory-hungry tasks are tasks that consume a large portion of the available storage allocated for a particular package, such as package 410. Task 430 and task 432 each try to consume a majority of the available shared L2 cache 416. Task utilization 440 is the portion of memory necessary to hold page accesses for task 430. Task utilization 442 is the portion of memory necessary to hold page accesses for task 432. Shared L2 cache 416 is not large enough to hold both task utilization 440 and task utilization 442 at a given time. Thus, there is contention between task 430 and task 432 for the resources of shared L2 cache 416. Contention 444 is that portion of shared L2 cache 416 for which both task 430 and task 432 compete.

Task 434 and task 436 are CPU-hungry tasks. CPU-hungry tasks are tasks that consume a large portion of the available processing resources allocated for a particular package, such as package 420. While task 434 and task 436 each try to consume a majority of the available processing resources of package 420, neither task 434 nor task 436 is particularly memory-hungry. Task utilization 450 is the portion of memory necessary to hold page accesses for task 434. Task utilization 452 is the portion of memory necessary to hold page accesses for task 436. Thus, the available resources of shared L2 cache 426 are underutilized. Underutilization 454 is that portion of shared L2 cache 426 that neither task 434 nor task 436 utilize.

In multi-core system 400, task 430 is placed on core 412, while task 432 is placed on core 414. Core 412 and core 414 share a common shared L2 cache 416. As a result, task 430 and task 432 contend with each other for a cache footprint, evicting cache lines belonging to the other tasks. This cache eviction by the competing tasks can lead to overall performance slowdown of package 410.

In multi-core system 400, task 434 is placed on core 422, while task 436 is placed on core 424. Core 422 and core 424 share a common shared L2 cache 426. Neither task 434 nor task 436 requires a large cache footprint due to the low demand for memory bandwidth. Shared L2 cache 426 of package 420 therefore remains relatively underutilized.

Figure 5:
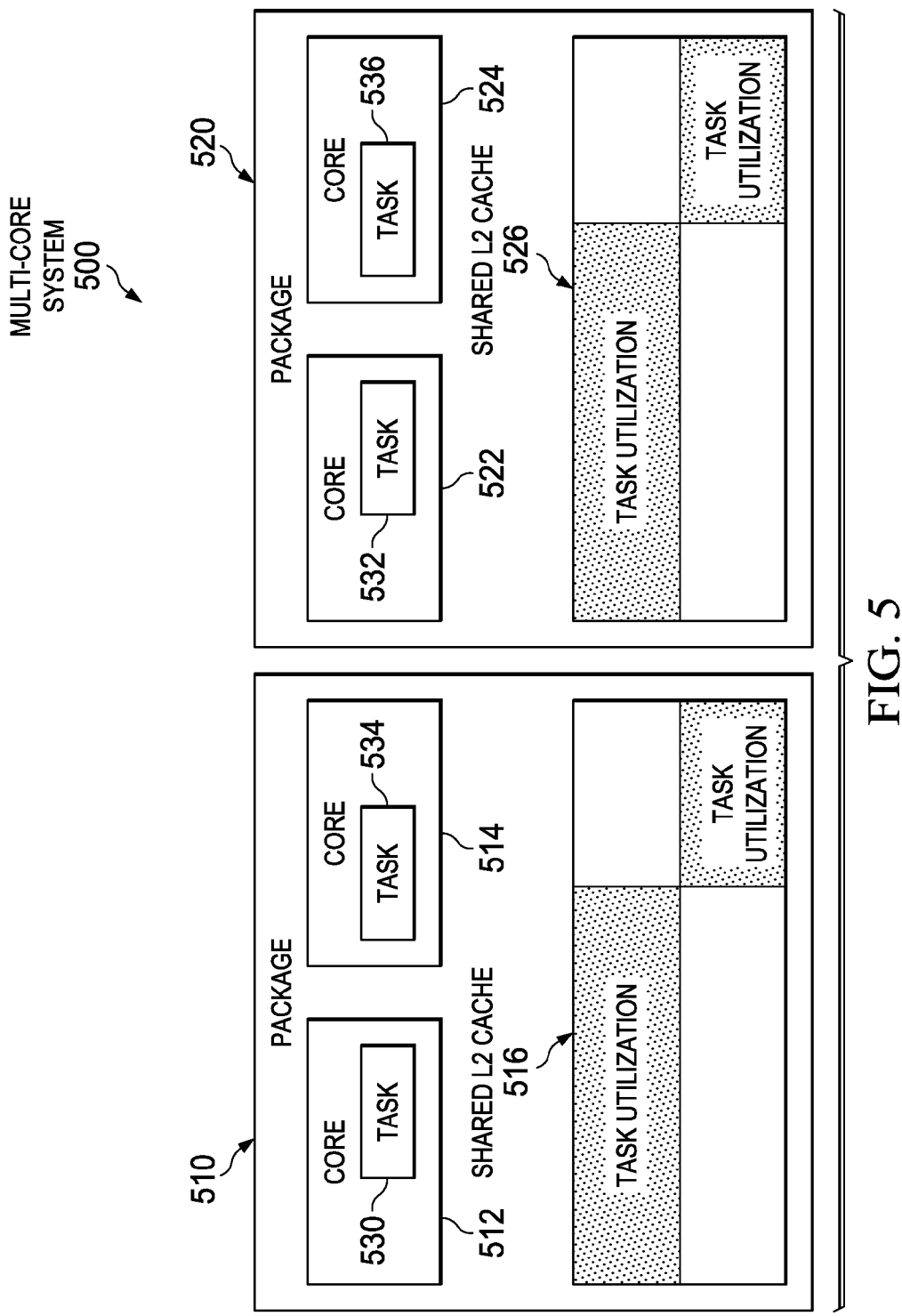
FIG. 5 is a second task placement of tasks on a multi-core data processing system according to an illustrative embodiment.

Referring now to FIG. 5, a second task placement of tasks on a multi-core data processing system is shown according to an illustrative embodiment. Multi-core system 500 is multi-core system 400 of FIG. 4.

Multi-core system 500 includes four tasks, task 530, task 532, task 534, and task 536. Task 530 is task 430 of FIG. 4. Task 532 is task 432 of FIG. 4. Task 534 is task 434 of FIG. 4. Task 536 is task 436 of FIG. 4.

In multi-core system 500, tasks 530-536 have been assigned to core 512, core 514, core 522, and core 524 to better utilize system resources. In multi-core system 500, core 512 executes task 530. Core 514 executes task 534. Core 522 executes task 532. Core 524 executes task 536.

Task 530 and task 532 are memory-hungry tasks. Task 530 tries to consume a majority of the available shared L2 cache 516, while task 532 tries to consume a majority of the available shared L2 cache 526. Task 534 and task 536 are CPU-hungry tasks. While task 534 and task 536 each try to consume a majority of the available processing resources of package 510 and 520, neither task 534 nor task 536 is particularly memory hungry. By placing the two memory hungry tasks, task 530 and task 532, onto separate packages, task 530 and task 532 no longer compete with one another for memory bandwidth, as in package 410 of FIG. 4. This reduced contention within shared L2 cache 516 can lead to better performance of package 510 over package 410 of FIG. 4. Better cache utilization of both shared L2 cache 516 and shared L2 cache 526 can lead to better performance of multi-core system 500 over multi-core system 400 of FIG. 4.

Illustrative embodiments described herein provide a system and method for optimizing task placement during runtime without programming cues regarding the relative memory-hungry or CPU-hungry nature of the various tasks. Programming cues are some indication within the code itself regarding the relative memory-hungry or CPU-hungry nature of the various tasks. A runtime optimization scheme for task placement in a multi-core system is shown, taking into account the hardware resource sharing aspects of the various CPUs, as well as the characteristics of tasks with respect to their resource demand and usage. The runtime optimization scheme is performed without programming cues regarding the characteristics of the tasks. Furthermore, the runtime optimization scheme is performed without adversely affecting other goals of task placement, such as for example, but not limited to, fair execution time for all tasks, and reduced power consumed in executing tasks.

The illustrative embodiments provide a computer implemented method that influences task placement within a multiple processor computer. Tasks are classified as either memory bound or CPU bound by observing certain performance counters over the task execution. During a first pass of task load balance, tasks are balanced across various CPUs to achieve a fairness goal, where tasks are allocated CPU resource in accordance to their established fairness priority value. During a second pass of task load balance, tasks are rebalanced across CPUs to reduce CPU resource contention, such that the rebalance of tasks in the second pass does not violate fairness goals established in the first pass. In one embodiment, the second pass could involve re-balancing memory bound tasks across different cache domains, where CPUs in a cache domain share a same last mile CPU cache such as an L3 cache. In another embodiment, the second pass could involve re-balancing CPU bound tasks across different CPU domains of a cache domain, where CPUs in a CPU domain could be sharing some or all of CPU execution unit resources. The two passes could be executed at different frequencies.

Figure 6:
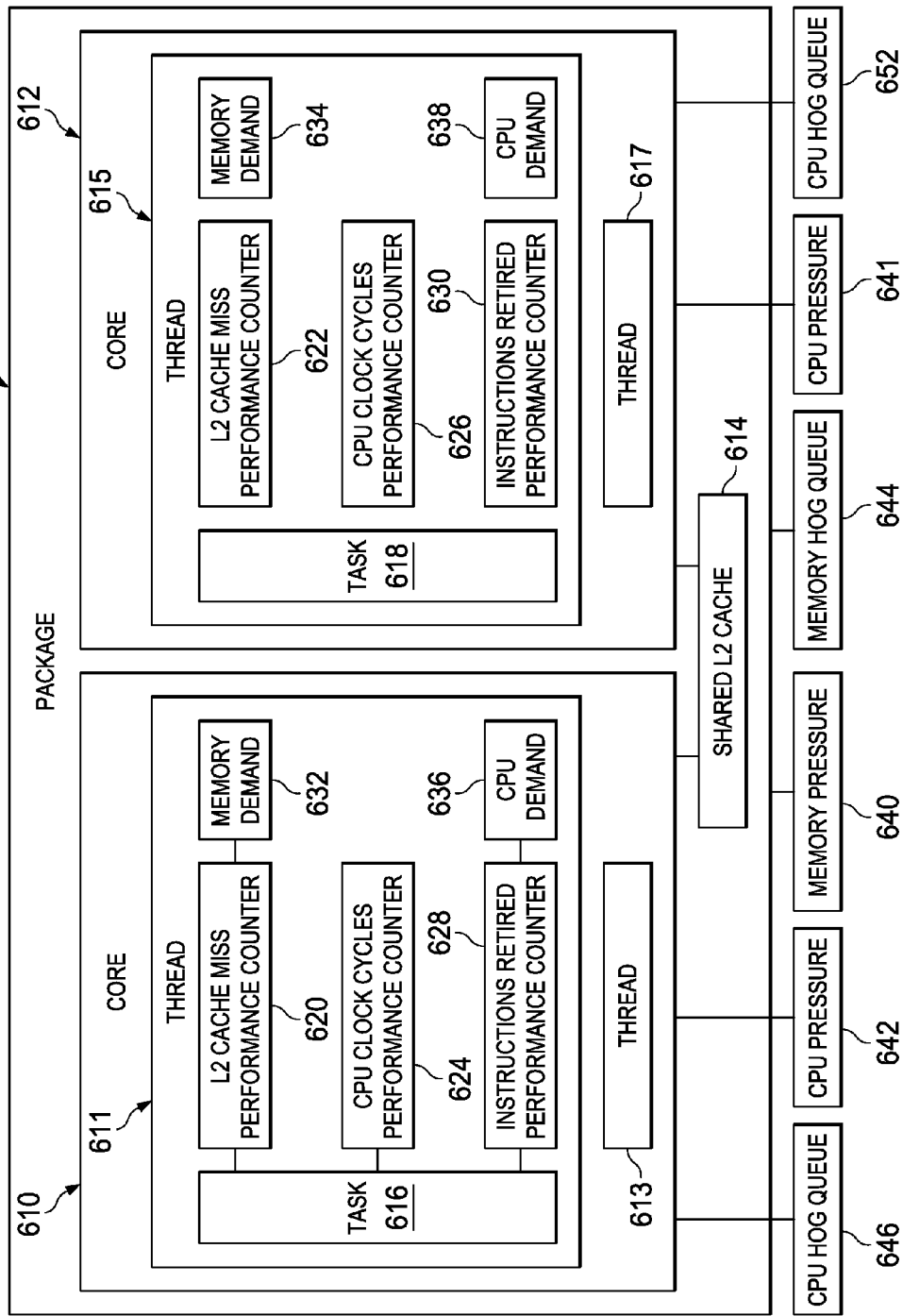
FIG. 6 is a data flow diagram of a multi-core system for optimizing task placement during runtime according to an illustrative embodiment.

Referring now to FIG. 6, a data flow diagram of a multi-core system for optimizing task placement during runtime is shown according to an illustrative embodiment. Package 600 is a package, such as package 310 and 340 of FIG. 3.

Package 600 includes core 610 and core 612. Core 610 and core 612 are cores, such as core 312 and core 314 of FIG. 3. Core 610 and core 612 share shared L2 cache 614. Shared L2 cache 614 is a shared cache, such as shared L2 cache 324 of FIG. 3.

Each core contains two hardware threads. Core 610 contains hardware threads 611 and 613, while core 612 contains hardware threads 615 and 617. Thread 611 executes task 616. Thread 615 executes task 618. Each of task 616 and task 618 is a task such as one of task 430, task 432, task 434, or task 436 of FIG. 4. Neither of task 616 nor task 618 has been provided programming cues regarding the relative memory-hungry or CPU-hungry nature of the various tasks.

Threads 613 and 617 also execute tasks, such as task 616 and task 618. For simplicity, other tasks executing in threads 613 and 617 are not explicitly shown in FIG. 6.

Each of task 616 and task 618 is monitored by several performance counters that are used to derive characteristics of the workload on core 610 and core 612. The derived characteristics are then used to influence task placement decisions.

L2 cache miss performance counter 620 is a counter that monitors cache misses for data requested by task 616 within shared L2 cache 614. Each time that some data requested by task 616 is not found within shared L2 cache 614, L2 cache miss performance counter 620 increments. Similarly, L2 cache miss performance counter 622 is a counter that monitors cache misses for data requested by task 618 within shared L2 cache 614. Each time that some data requested by task 618 is not found within shared L2 cache 614, L2 cache miss performance counter 622 increments.

CPU clock cycles performance counter 624 is a counter that monitors a number of elapsed clock cycles while task 616 is executing on hardware thread 611 in core 610. While task 616 is executing on hardware thread 611 in core 610, CPU clock cycles performance counter 624 is incremented for each clock cycle that elapses. Similarly, CPU clock cycles performance counter 626 is a counter that monitors a number of elapsed clock cycles while task 618 is executing on hardware thread 615 in core 612. While task 618 is executing on hardware thread 615 in core 612, CPU clock cycles performance counter 626 is incremented for each clock cycle that elapses.

Instructions retired performance counter 628 is a counter that monitors a number of instructions retired while task 616 is executing on hardware thread 611 in core 610. Each instruction is a single operation performed by hardware thread 611 in core 610. Task 616 typically consists of multiple instructions. An instruction is retired when the operation associated with the instruction has been performed. Similarly, instructions retired performance counter 630 is a counter that monitors a number of instructions retired while task 618 is executing on hardware thread 615 in core 612.

Memory demand 632 is a relative measure of how memory bound task 616 is. That is, memory demand 632 is a characterization of the relative memory-hungriness of task 616. Similarly, memory demand 634 is a characterization of the relative memory-hungriness of task 618. In one illustrative embodiment, memory demand is determined according to the following formula:

$$\text{Memory Demand} = \frac{(L2\ \text{cache\ miss performance counter}) * (\text{Scaling factor})}{(CPU\ \text{clock cycles performance counter})}$$

The scaling factor is an arbitrary number chosen to ensure that memory demand remains a positive integer. The scaling factor ensures that fractional integers do not occur, since floating point operations are not recommended in the operating system kernel.

Thus, memory demand 632 is dependent upon L2 cache miss performance counter 620 and CPU clock cycles performance counter 624. The higher the count of L2 cache miss performance counter 620, the more memory-hungry task 616 is characterized as being. Conversely, the lower the count of L2 cache miss performance counter 620, the less memory-hungry task 616 is characterized as being.

Similarly, memory demand 634 is dependent upon L2 cache miss performance counter 622 and CPU clock cycles performance counter 626. The higher the count of L2 cache miss performance counter 622, the more memory-hungry task 618 is characterized as being. Conversely, the lower the count of L2 cache miss performance counter 622, the less memory-hungry task 618 is characterized as being.

At the end of a scheduled timeslice for task 616, memory demand 632 is decayed. Similarly, at the end of a scheduled timeslice for task 618, memory demand 634 is decayed. By decaying memory demand 632 and memory demand 634, memory demand 632 and memory demand 634 always represent current execution characteristics of task 616 and task 618, with respect to the current resource needs. In one illustrative embodiment, memory demand is decayed according to the following formula:

$$\text{Memory Demand} = \frac{\text{Memory Demand}}{2}$$

Tasks whose memory demand exceeds a certain threshold are classified as "memory hogs" or "memory hungry" tasks.

CPU demand 636 is a relative measure of how CPU bound task 616 is. That is, CPU demand 636 is a characterization of the relative CPU-hungriness of task 616. Similarly, CPU demand 638 is a characterization of the relative CPU-hungriness of task 618. In one illustrative embodiment, CPU demand is determined according to the following formula:

$$CPU\ \text{Demand} = \frac{(\text{Instructions retired performance counter}) * (\text{Scaling factor})}{(CPU\ \text{clock cycles performance counter})}$$

The scaling factor is an arbitrary number chosen to ensure that CPU demand remains a positive integer. The scaling factor ensures that fractional integers do not occur, since floating point operations are not recommended in the operating system kernel.

Thus, CPU demand 636 is dependent upon instructions retired performance counter 628 and CPU clock cycles performance counter 624. The higher the count of instructions retired performance counter 628, the more CPU-hungry task 616 is characterized as being. Conversely, the lower the count of instructions retired performance counter 628, the less CPU-hungry task 616 is characterized as being.

Similarly, CPU demand 638 is dependent upon instructions retired performance counter 630 and CPU clock cycles performance counter 626. The higher the count of instructions retired performance counter 630, the more CPU-hungry task 618 is characterized as being. Conversely, the lower the count of instructions retired performance counter 630, the less memory-hungry task 618 is characterized as being.

At the end of a scheduled timeslice for task 616, CPU demand 636 is decayed. Similarly, at the end of a scheduled timeslice for task 618, CPU demand 638 is decayed. By decaying CPU demand 636 and CPU demand 638, CPU demand 636 and CPU demand 638 always represent current execution characteristics of task 616 and task 618, with respect to the current resource needs. In one illustrative embodiment, CPU demand is decayed according to the following formula:

$$CPU\ \text{Demand} = \frac{CPU\ \text{Demand}}{2}$$

Tasks whose CPU demand exceeds a certain threshold are classified as "CPU hogs" or "CPU hungry" tasks.

Memory pressure is a measure of the number of memory bound tasks a particular cache domain currently has on its run queues. Groups of cores within a package that share a common last-mile cache can be considered to belong to the same cache domain. Thus, memory pressure 640 is a measure of the number of memory bound tasks for the cache domain of shared L2 cache 614. Memory pressure is generally determined by the following formula:

$$\text{Memory Pressure} = \sum_{1}^{N} \text{Memory Demand}_n$$

In other words, memory pressure of a cache domain is the summation of memory demand of all tasks within the cache domain. Specifically, memory pressure 640 is determined by a summation of memory demand 632 and memory demand 634. Since we have not shown tasks in threads 613 and 617, it should be assumed that memory pressure 640 contains the memory demands of those tasks which are not shown.

CPU pressure is a measure of the number of CPU bound tasks a particular CPU domain currently has on its run queues. A CPU domain comprises CPUs that share some or all of CPU execution units. Thus, CPU pressure 642 is a measure of the number of CPU bound tasks for the CPU domain comprising core 610. CPU pressure is generally determined by the following formula:

$$CPU\ \text{Pressure} = \sum_{1}^{N} CPU\ \text{Demand}_n$$

In other words, CPU pressure of a CPU domain is the summation of CPU demand of all tasks within the CPU domain. Specifically, CPU pressure 642 is determined by a summation of CPU demand 636 and CPU demand of any task running in hardware thread 613. Similarly CPU pressure 641 is determined by a summation of CPU demand 638 and CPU demand of any task that may be running in thread 617. It needs to be remembered that we have not explicitly shown the tasks running in hardware threads 613 and 617.

Memory hog queue 644 is a data structure to hold tasks that have been designated as memory hungry tasks. Memory hog queue 644 is a list of tasks classified as memory hogs that are executing on a core within the cache domain for shared L2 cache 614, such as core 610 or core 612. Memory hog queues, such as memory hog queue 644, are created on a per cache domain basis. That is, each cache domain will have a separate memory hog queue.

CPU hog queue 646 and CPU hog queue 652 are data structures to hold tasks that have been designated as CPU hungry tasks. Both CPU hog queue 646 and CPU hog queue 652 are a list of tasks classified as CPU hogs that are executing on the threads of a core, such as threads 611 and 613 of core 610. CPU hog queues, such as CPU hog queue 646 and CPU hog queue 652 are created on a per CPU domain basis. That is, each CPU domain will have a separate CPU hog queue. Different CPUs or threads of a core that share execution units can be considered to belong to a same CPU domain.

Figure 7:
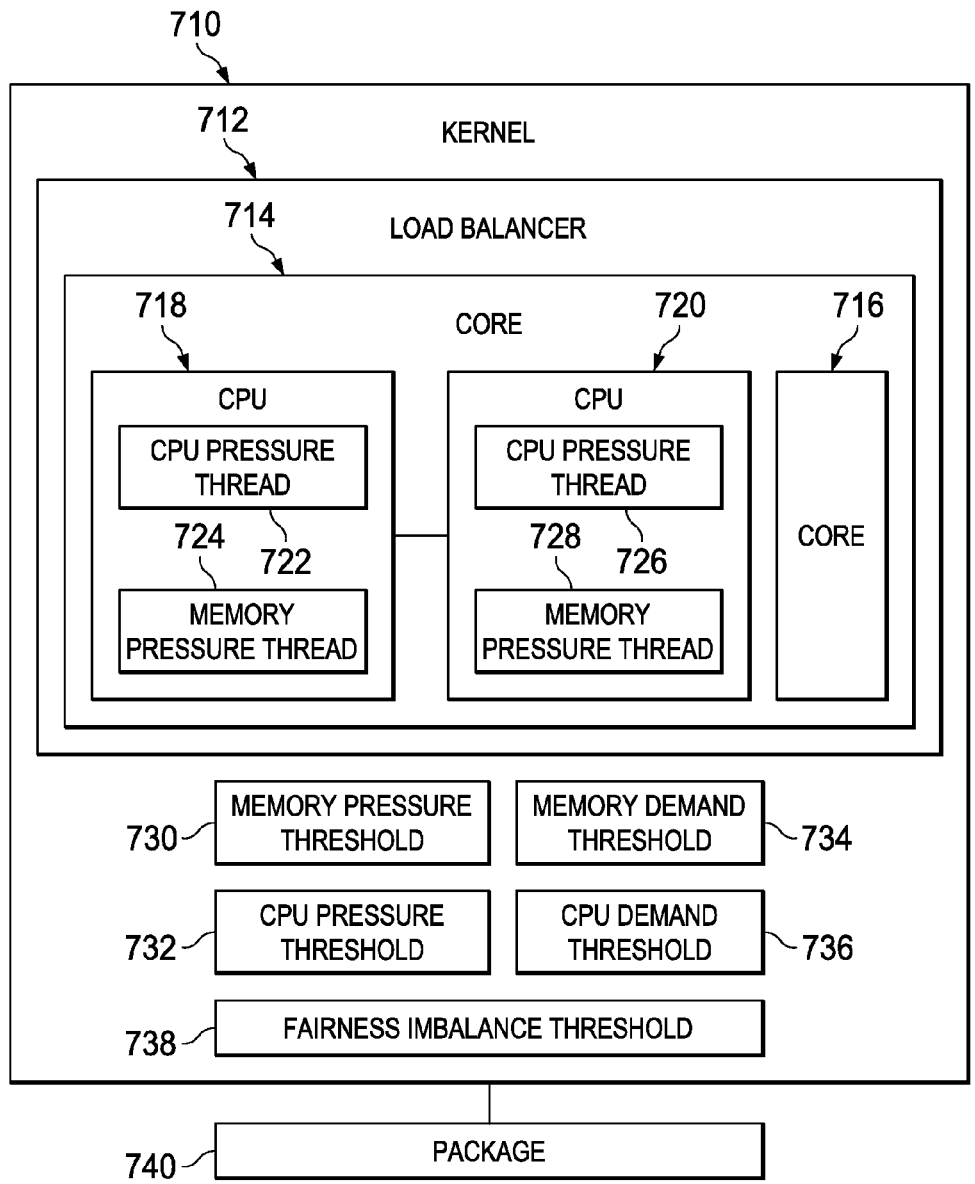
FIG. 7 is a data flow of a kernel load balancer for optimizing task placement during runtime according to an illustrative embodiment.

Referring now to FIG. 7, a data flow of a kernel load balancer for optimizing task placement during runtime is shown according to an illustrative embodiment. Kernel 710 is a kernel within an operating system of a data processing system, such as data processing system 200 of FIG. 2. CPU 718 and CPU 720 are hardware threads of a core, similar to hardware threads 611 and 613 of core 610 shown in FIG. 6. Core 716 has similar hardware threads within itself, not shown in the figure for simplicity.

While memory pressure thread 724 and CPU pressure thread 722 are described as separate threads, more or fewer threads could also be used. In one illustrative embodiment, memory pressure thread 724 and CPU pressure thread 722 can comprise a single thread. The single thread would perform both memory and CPU pressure based balancing. In another embodiment, a memory pressure thread could be created per cache domain, while CPU pressure thread could be created per CPU domain.

Load balancer 712 is a software component for distributing workload evenly across the various packages and cores of a multi-processing system, such as multi-core system 300 of FIG. 3. Each task in the system is assigned some priority or "fairness weight" by administrator. This priority or "fairness" weight of a task is used by a load balancer to determine how much "fair" amount of CPU resource a task should be granted. To achieve this "fairness" goal, load balancer distributed tasks across CPUs such that task weight is balanced across CPUs of all domains. In case the task weight is not evenly balanced, then it is possible that some task could be denied its fair share of CPU resource, leading to a poor implementation of "fair" scheduler. FIG. 9A-9B, FIG. 10, and FIG. 11 collectively describe how a load balancer operates to meet fairness goal in addition to balanced CPU/memory pressure goals. Load balancer 712 includes per-CPU threads to monitor and balance memory pressure between cache domains and CPU pressure between CPU domains.

Load balancer 712 includes per-CPU memory pressure threads such as memory pressure thread 724 and memory pressure thread 728. There will be similar per-CPU memory pressure threads belonging to CPUs of core 716. However, per-CPU memory pressure threads belonging to CPUs of core 716 are not shown in the diagram for simplicity. Each memory pressure thread, when run, tries to balance the memory pressure of its package with other packages of the multi-processing system.

Load balancer 712 includes per-CPU CPU pressure threads such as CPU pressure thread 722 and CPU pressure thread 726. There will be similar per-CPU CPU pressure threads belonging to CPUs of core 716. However, per-CPU CPU pressure threads belonging to CPUs of core 716 are not shown in the diagram for simplicity. Each CPU pressure thread, when run, tries to balance the CPU pressure of its CPU domain with other CPU domains of the same cache domain of the multiprocessing system.

Memory pressure threshold 730 is defined in the kernel. A memory pressure threshold is a minimum difference between memory pressures of two cache domains, below which the two domains are considered to be of same memory pressure. If the pressure difference between two cache domains is above threshold 730, then the two domains are said to be imbalanced with regard to memory pressure and load balancer will attempt to balance the pressure.

CPU pressure threshold 732 is defined in the kernel. A CPU pressure threshold is a minimum difference between CPU pressures of two CPU domains, below which the two domains are considered to be of same CPU pressure. If the pressure difference between two CPU domains is above threshold 732, then the two domains are said to be imbalanced with regard to CPU pressure and load balancer will attempt to balance the pressure.

Memory demand threshold 734 is defined in the kernel. Memory demand threshold is a memory demand value that delineates between tasks that are considered to be memory hogs and tasks that are not considered to be memory hogs.

CPU demand threshold 736 is defined in the kernel. A CPU demand threshold is a CPU demand value that delineates between tasks that are considered to be CPU hogs and tasks that are not considered to be CPU hogs.

Fairness imbalance threshold 738 is defined in the kernel. A fairness imbalance threshold is a threshold that delineates when certain tasks should or should not be reallocated from one domain to another domain in order to balance task (or fairness) weight across the domains.

Figure 8A:
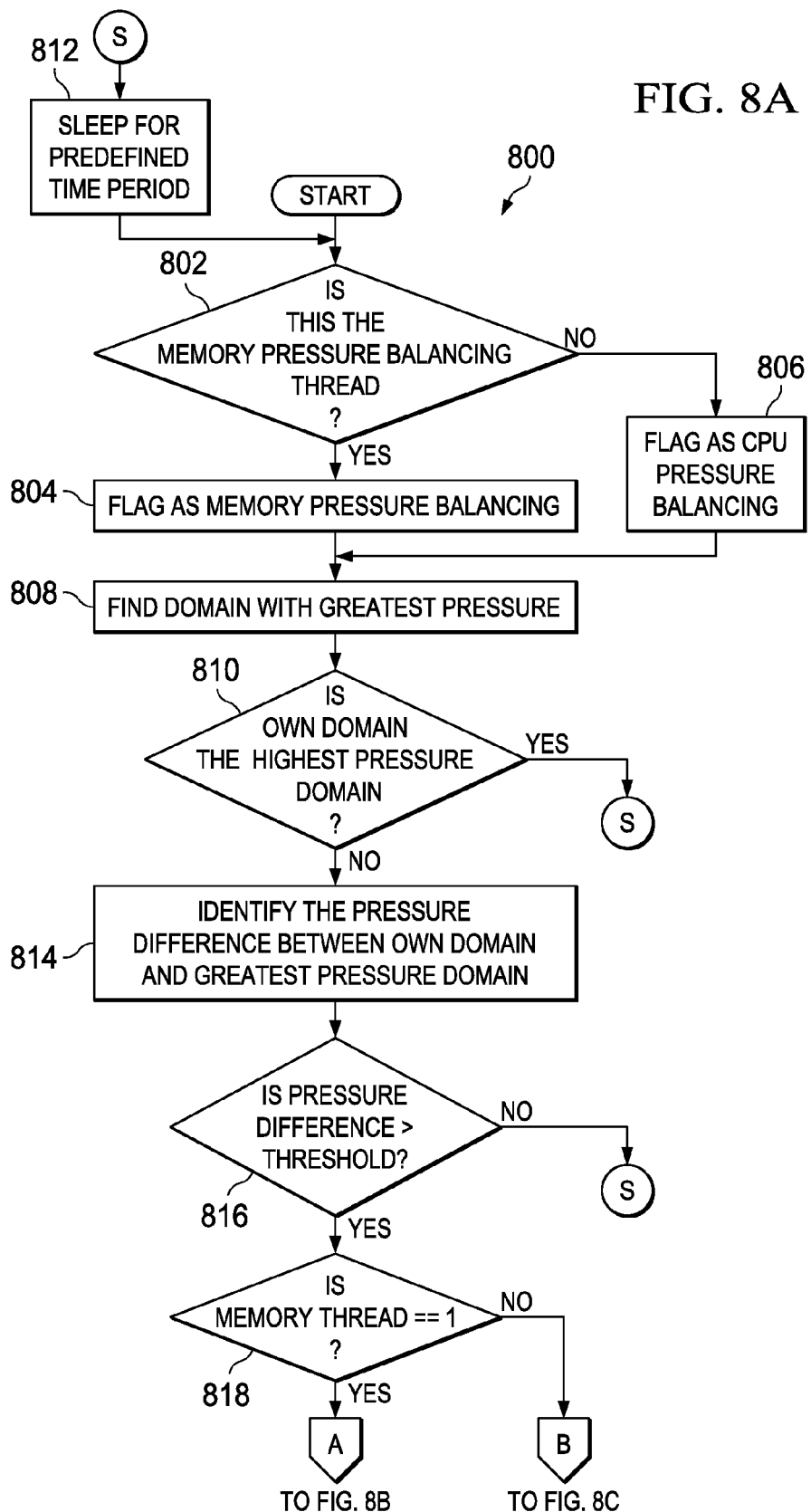
FIGS. 8A, 8B and 8C are flowcharts of a process for optimizing task placement during runtime according to an illustrative embodiment.
Figure 8B:
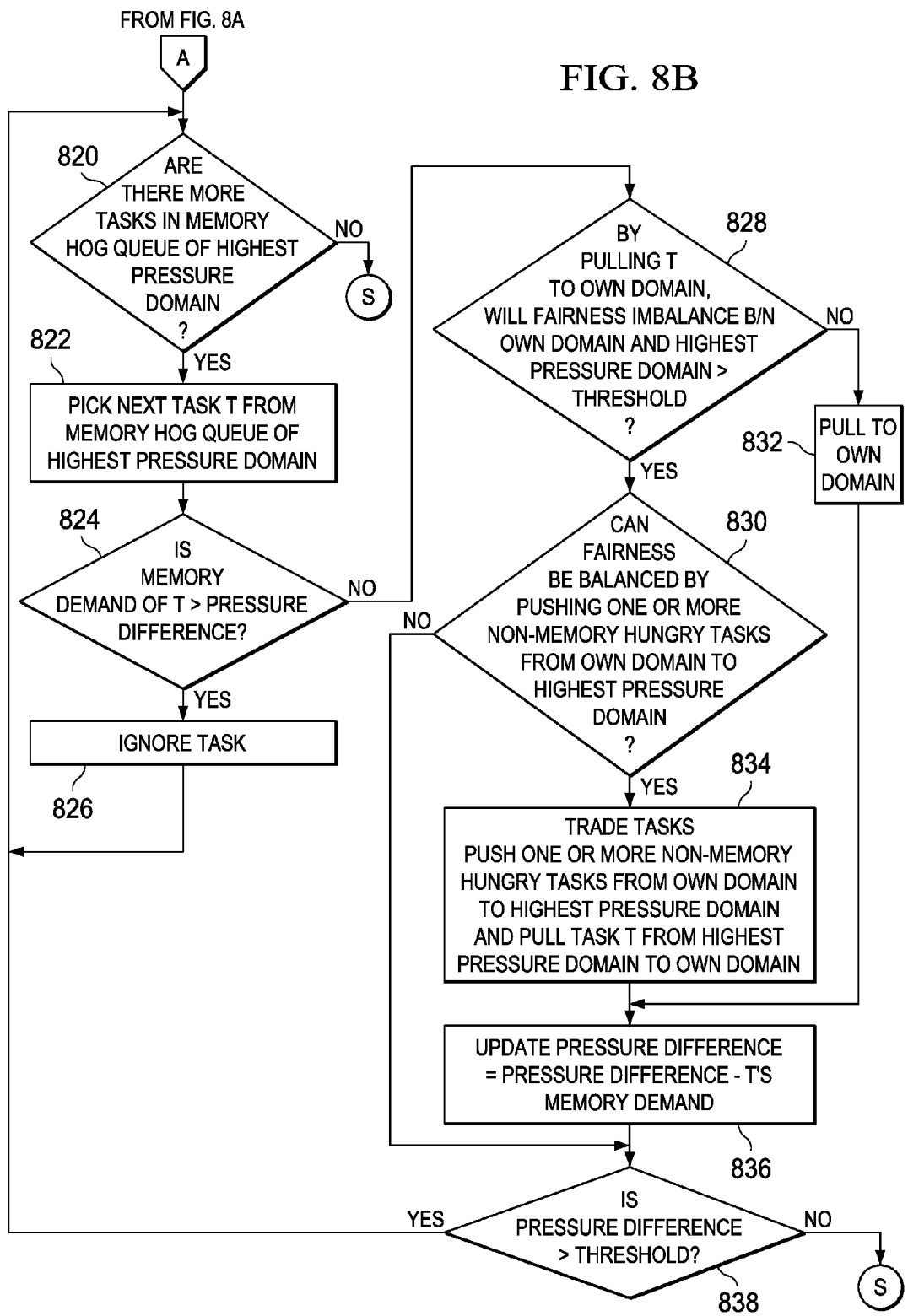
Figure 8C:
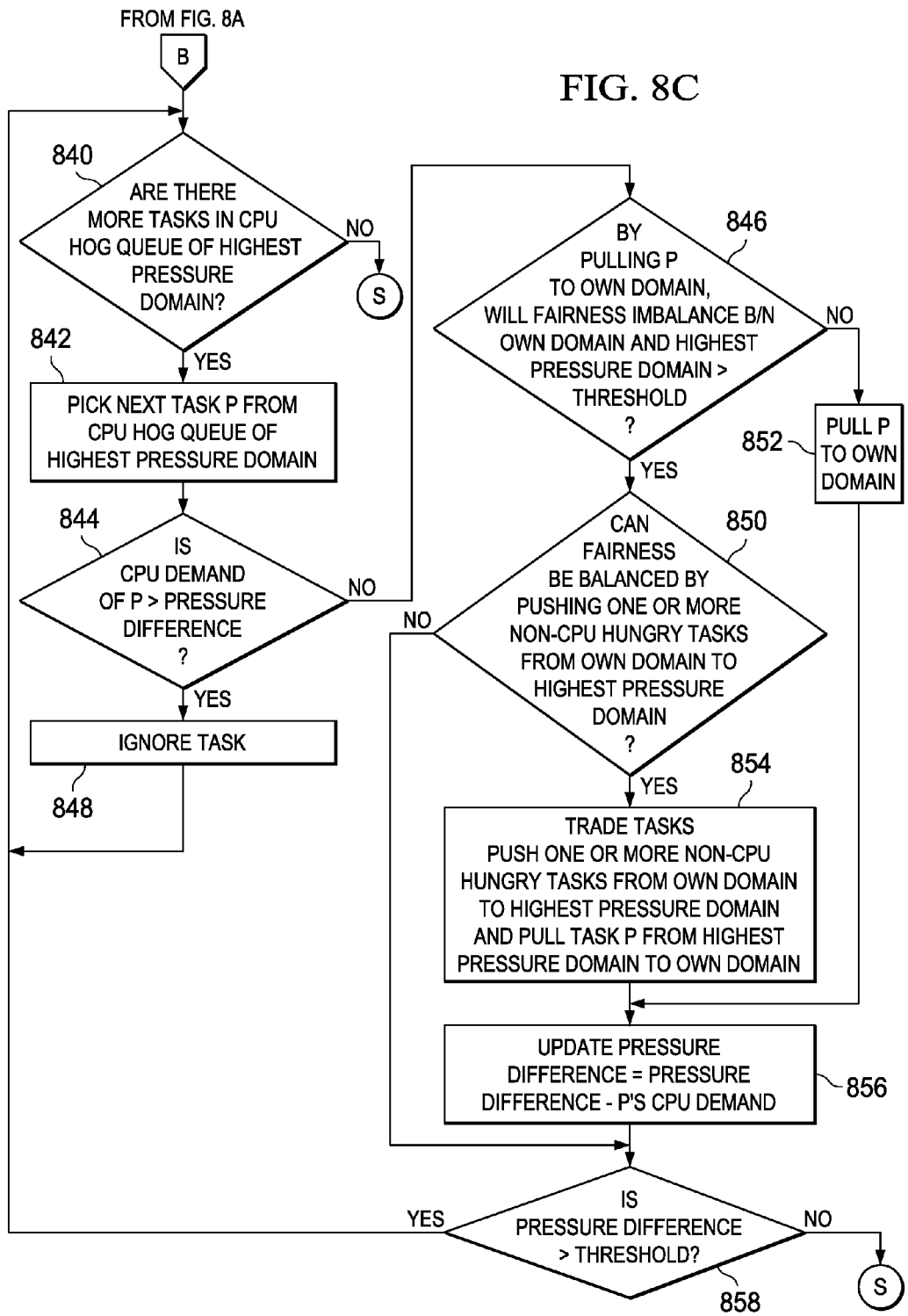

Referring now to FIGS. 8A-8C, flowcharts of a process for optimizing task placement during runtime is shown according to an illustrative embodiment. Process 800 is a software process occurring within a software component, such as within one of memory pressure thread 724, CPU pressure thread 722, memory pressure thread 728, or CPU pressure thread 726 of load balancer 712 of FIG. 7. Each monitor thread within core 714 will periodically execute the task placement optimization process.

Referring now particularly to FIG. 8A, process 800 begins by determining whether the thread running is the memory pressure balancing thread (step 802). Responsive to determining that the thread running is the memory pressure balancing thread ("yes" at step 802), process 800 flags the process as memory pressure balancing (step 804). Responsive to determining that the thread running is not the memory pressure balancing thread ("no" at step 802), process 800 flags the process as CPU pressure balancing (step 806). This flag is used later in step 818.

Process 800 then finds the domain with the greatest pressure (step 808). If the thread executing process 800 is a memory pressure thread, such as memory pressure thread 724 of FIG. 7, the memory pressure thread will examine the memory pressure, such as memory pressure 640 of FIG. 6, of both itself and other cache domains within the multiprocessing system. If process 800 is a CPU pressure thread, such as CPU pressure thread 722 of FIG. 7, the CPU pressure thread will examine the CPU pressure, such as CPU pressure 642 of FIG. 6, of both itself and other CPU domains within the same cache domain.

Process 800 then determines whether the domain with the greatest pressure is its own domain (step 810). Responsive to determining that its own domain is the domain with the greatest pressure ("yes" at step 810), process 800 sleeps for a predefined time period (step 812). During this predefined time, memory and CPU pressure within various domains may change due to task execution and reallocation. Process 800 then iterates back to step 802 to continue monitoring the various domains.

Returning now to step 810, responsive to determining that its own domain is not the domain with the greatest pressure ("no" at step 810), process 800 identifies the difference in pressure between the domain having greatest pressure its own domain (step 814). Process 800 then compares the identified pressure difference to a pressure threshold to determine whether the identified pressure difference is greater than the pressure threshold (step 816). If the thread executing process 800 is a memory pressure thread, the identified memory pressure difference is compared to a memory pressure threshold. The memory pressure threshold is memory pressure threshold 730 of FIG. 7. If the thread executing process 800 is a CPU pressure thread, the identified CPU pressure difference is compared to a CPU pressure threshold. The CPU pressure threshold is CPU pressure threshold 732 of FIG. 7.

Responsive to determining that the identified pressure difference is not greater than the pressure threshold ("no" at step 816), process 800 iterates back to step 812 to sleep for a predefined time period. During this predefined time, memory and CPU pressure within various domains may change due to task execution and reallocation. Process 800 then iterates back to step 802 to continue monitoring the various domains.

Returning now to step 816, responsive to determining that the identified pressure difference is greater than the pressure threshold ("yes" at step 816), process 800 identifies whether the thread running is the memory pressure balancing thread (step 818). Process 800 can identify the thread by examining the flag set in step 802. Responsive to determining that the thread running is the memory pressure balancing thread, process 800 proceeds to FIG. 8B for memory pressure balancing. (Connector A in the flowchart shows the control flow between FIGS. 8A and 8B.)

Referring now to FIG. 8B, process 800 identifies whether additional tasks are held within the memory hog queue of the highest pressure domain (step 820). Responsive to determining that no additional tasks are held within the memory hog queue of the highest pressure domain ("no" at step 820), process 800 iterates back to step 812 (in FIG. 8A) to sleep for a predefined time period. During this predefined time, memory and CPU pressure within various cache domains may change due to task execution and reallocation. Process 800 then iterates back to step 802 to continue monitoring the various domains.

Returning now to step 820, responsive to determining that additional tasks are held within the memory hog queue of the highest pressure domain ("yes" at step 820), process 800 picks the next task from the memory hog queue of the highest pressure domain (step 822).

Process 800 proceeds to step 824 where it then determines whether the memory demand for the particular task within the memory hog queue is greater than the pressure difference determined in step 814.

Responsive to determining that the identified memory demand for the particular task is greater than the pressure difference ("yes" at step 824), process 800 ignores the particular task (step 826). Because the memory demand for the identified task is greater than the pressure difference, the identified task is not a candidate for task reallocation. No net processing gain is realized if a memory hog situation is simply shifted from one domain to another. Hence, process 800 then iterates back to step 820 to examine other tasks in the memory hog queue.

Returning now to step 824, responsive to determining that the identified memory demand for a particular task is not greater than the pressure difference ("no" at step 824), process 800 determines whether a fairness imbalance between its own cache domain and the highest memory pressure domain will exceed the fairness imbalance threshold, (738 of FIG. 7) if the particular task is pulled to its own cache domain (step 828). No net processing gain is realized if a memory hog situation is transformed into fairness imbalance situation for the scheduler. Therefore, process 800 ensures that pulling the identified process will not result in a severe fairness imbalance for the system leading to further re-balancing activities.

Responsive to determining that a fairness imbalance between its own cache domain and the highest pressure domain will not exceed the fairness imbalance threshold, if the particular task is pulled to its own cache domain ("no" at step 828), process 800 pulls the identified task to its own domain (step 832). Since there will be no fairness imbalance between source and target domains by pulling the identified task, the identified task is a candidate for task reallocation. Process 800 therefore dequeues the identified task from the domain with the greatest pressure and enqueues the task to its own domain. The task is removed from the memory hog queue and run queue of highest pressure domain and added to memory hog queue and some run queue of own domain.

Process 800 then updates the pressure difference between the cache domain from which the task was removed and its own cache domain (step 836). The updated memory pressure difference is set equal to the difference between the original memory pressure difference and the reallocated task's memory demand.

Process 800 then determines whether the updated pressure difference is greater than memory pressure threshold (step 838). Responsive to determining that the updated pressure difference is greater than memory pressure threshold ("yes" at step 838), process 800 iterates back to step 820 to find more candidate tasks to pull into its own domain.

Responsive to determining that the updated pressure difference is less than or equal to memory pressure threshold ("no" at step 838), process 800 iterates back to step 812 to sleep for a predefined time period. During this predefined time, memory and CPU pressure within various cache domains may change due to task execution and reallocation. Process 800 then iterates back to step 802 to continue monitoring the various domains.

Returning now to step 828, responsive to determining that the fairness imbalance between its own cache domain and the highest memory domain will exceed the fairness imbalance threshold if the particular task is pulled to its own cache domain ("yes" at step 828), process 800 determines whether fairness can be balanced by pushing one or more non-memory hungry tasks, whose combined fairness weight is that of task T from its own domain to the highest pressure domain (step 830). Here, the memory hog situation is simply shifted to a severe fairness imbalance from one domain to another if the process is reallocated. Therefore, process 800 attempts to identify any enqueued processes within its domain that can be swapped with the memory hungry process.

Responsive to determining that fairness cannot be balanced by pushing one or more non-memory hungry tasks from its own domain to the highest pressure domain ("no" at step 830), process 800 iterates back to step 838 to determine whether the updated pressure difference is greater than memory pressure threshold.

Returning now to step 830, responsive to determining that fairness can be balanced by pushing one or more non-memory hungry tasks from its own domain to the highest pressure domain ("yes" at step 830), process 800 trades the tasks (step 834). One or more non-memory hungry tasks, whose combined fairness weight is that of task T, are pushed from the current domain to the highest pressure domain, and the memory hog task from the highest memory pressure domain is pulled to the current domain. Swapping such non-memory hungry processes with the memory hungry processes results in a situation wherein the pressure difference between the domains does not exceed the memory pressure threshold, such as memory pressure threshold 730 of FIG. 7 and fairness difference between the domains does not exceed the fairness imbalance threshold, such as threshold 738 of FIG. 7.

Process 800 updates the pressure difference between the cache domain from which the task was removed, and its own cache domain (step 836). The updated memory pressure difference is set equal to the difference between the original memory pressure difference and the reallocated task's memory demand.

Returning now to step 818 (of FIG. 8A), responsive to determining that the thread running is the CPU pressure balancing thread ("CPU pressure balancing thread" at step 818), process 800 proceeds to FIG. 8C for CPU pressure balancing. (Connector B in the flowchart shows the control flow between FIGS. 8A and 8C).

Referring now to FIG. 8C, process 800 identifies whether additional tasks are held within the CPU hog queue of the highest pressure domain (step 840). Responsive to determining that no additional tasks are held within the CPU hog queue of the highest pressure domain ("no" at step 840), process 800 iterates back to step 812 to sleep for a predefined time period.

During this predefined time, CPU and CPU pressure within various cache domains may change due to task' execution and reallocation. Process 800 then iterates back to step 802 to continue monitoring the various domains.

Returning now to step 840, responsive to determining that additional tasks are held within the CPU hog queue of the highest pressure domain ("yes" at step 840), process 800 picks the next task from the CPU hog queue of the highest pressure domain (step 842).

Process 800 then determines whether the CPU demand for the particular task within the CPU hog queue is greater than the pressure difference determined in step 814 (step 844).

Responsive to determining that the identified CPU demand for the particular task is greater than the pressure difference ("yes" at step 844), process 800 ignores the particular task (step 848). Because the CPU demand for the identified task is greater than the pressure difference, the identified task is not a candidate for task reallocation. No net processing gain is realized if a CPU hog situation is simply shifted from one domain to another. Process 800 then iterates back to step 840 to examine other tasks in the CPU hog queue.

Returning now to step 844, responsive to determining that the identified CPU demand for the particular task is less than the pressure difference ("no" at step 844), process 800 determines whether the fairness imbalance between its own domain and the highest pressure domain will exceed the fairness imbalance threshold if the particular task is pulled to its own CPU domain (step 846). No net processing gain is realized if a CPU hog situation is transformed into a fairness imbalance situation for the scheduler. Therefore, process 800 ensures that pulling the identified process will not result in a severe fairness imbalance for the system leading to further re-balancing activities.

Responsive to determining that the fairness imbalance between its own domain and the highest pressure domain will not exceed the fairness imbalance threshold if the particular task is pulled to its own cache domain ("no" at step 846), process 800 pulls the identified task to its own CPU (step 852). Because the identified demand is less than the pressure difference, the identified task is a candidate for task reallocation. Process 800 therefore dequeues the identified task from the core with the greatest pressure and enqueues the task on its own related core. The identified task is also dequeued from the CPU hog queue of greatest pressure domain and added to CPU hog Queue of own domain.

Process 800 then updates the pressure difference between the domain from which the task was removed and its own domain (step 856). The updated CPU pressure difference is set equal to the difference between the original CPU pressure difference and the reallocated task's CPU demand.

Process 800 then determines whether the updated pressure difference is greater than CPU pressure threshold (step 858). Responsive to determining that the updated pressure difference is greater than CPU pressure threshold ("yes" at step 858), process 800 iterates back to step 840 to find more candidate tasks to pull into its own domain.

Responsive to determining that the updated pressure difference is less than or equal to CPU pressure threshold ("no" at step 858), process 800 iterates back to step 812 to sleep for a predefined time period. During this predefined time, CPU and CPU pressure within various CPU domains may change due to task execution and reallocation. Process 800 then iterates back to step 802 to continue monitoring the various domains.

Returning now to step 846, responsive to determining that the fairness imbalance between its own domain and the highest pressure domain will exceed the fairness imbalance threshold if the particular task is pulled to its own cache domain ("yes" at step 846), process 800 determines whether fairness can be balanced by pushing one or more non-CPU hungry tasks, whose combined fairness weight is same as that of task P from its own domain to the highest pressure domain (step 850). Here, the CPU hog situation is simply shifted to a severe fairness imbalance from one domain to another if the process is reallocated. Therefore, process 800 attempts to identify any enqueued processes within its domain that can be swapped with the CPU hungry process.

Responsive to determining that fairness cannot be balanced by pushing one or more non-CPU hungry tasks from its own domain to the highest pressure domain ("no" at step 850), process 800 iterates back to step 858 to determine whether the updated pressure difference is greater than zero.

Returning now to step 850, responsive to determining that fairness can be balanced by pushing one or more non-CPU hungry tasks from its own domain to the highest pressure domain ("yes" at step 850), process 800 trades the tasks (step 854). One or more non-CPU hungry tasks, whose combined fairness weigh is same as that of task P are pushed from the current domain to the highest pressure domain, and the CPU hungry task from the highest CPU pressure domain is pulled to the current domain. Swapping the enqueued processes with the CPU hungry processes results in a situation wherein the difference in CPU pressure between the domains does not exceed the CPU pressure threshold, such as pressure threshold 732 of FIG. 7 and the fairness difference between the domains does not exceed the fairness imbalance threshold, such as 738 in FIG. 7.

Process 800 then updates the pressure difference between the cache domain from which the task was removed and its own cache domain (step 856). The updated CPU pressure difference is set equal to the difference between the original CPU pressure difference and the reallocated task's CPU demand.

Figure 9B:
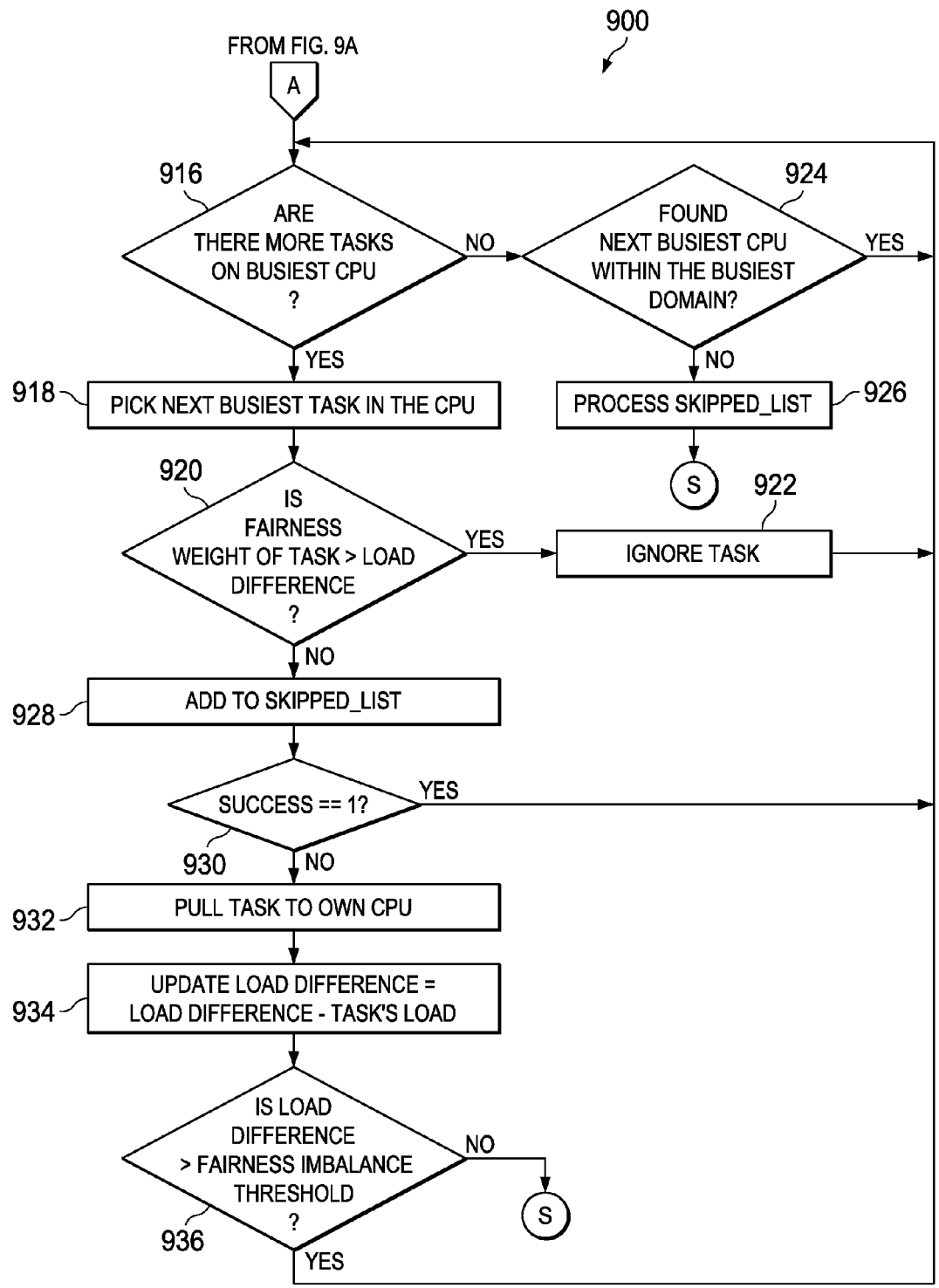

Referring now to FIG. 9A-9B, flowcharts for optimizing task placement during runtime is shown according to an illustrative embodiment. Process 900 is a software process occurring within a software component of load balancer 712 of FIG. 7. In one illustrative embodiment, process 900 can be implemented in a Unix-like operating system. The Unix-like operating system can be, for example, but not limited to, the Advanced Interactive Executive (AIX) operating system, a Linux operating system, or an OS/400 operating system. Each monitor thread within the kernel will periodically execute the task placement optimization process 900.

Referring now specifically to FIG. 9A, process 900 begins by initializing a skipped list (step 902). The skipped list is a data structure that is used to store candidate tasks for reallocation between cores, such as core 610 and core 612 of FIG. 6. The detailed steps for initializing the skipped list data structure is described in FIG. 10.

Process 900 then finds the busiest domain having greatest load (step 904). The load here is the scheduler's task load that needs to be balanced to keep fairness across the system. The scheduler's basic function is to reduce the load difference between any two CPUs or domains in the system. The domain chosen can be either a CPU domain or a cache domain.

Process 900 then determines whether the domain with the greatest load is its own domain (step 906). Responsive to determining that its own domain is the domain with the greatest load ("yes" at step 906), process 900 sleeps for a predefined time period (step 908). During this predefined time, the load within various domains may change due to task execution and reallocation. Process 900 then iterates back to step 902 to continue monitoring the various domains.

Returning now to step 906, responsive to determining that its own domain is not the domain with the greatest load ("no" at step 906), process 900 identifies the difference in load between the busiest domain and its own domain (step 910). Process 900 then compares the identified load difference to a fairness imbalance threshold to determine whether the identified load difference is greater than the fairness imbalance threshold (step 912). The fairness imbalance threshold is 738 of FIG. 7.

Responsive to determining that the identified pressure difference is not greater than the fairness imbalance threshold ("no" at step 912), process 900 iterates back to step 908 to sleep for a predefined time period. During this predefined time, the load within various domains may change due to task execution and reallocation. Process 900 then iterates back to step 902 to continue monitoring the various domains.

Returning again to step 912, responsive to determining that the identified load difference is greater than the fairness imbalance threshold ("yes" at step 912), process 900 then identifies the busiest CPU within the busiest domain (step 914). The CPU can be, for example, one of CPU 718 or 720 of FIG. 7. Process 900 then proceeds to FIG. 9B. (Connector A in the flowchart shows the flow between FIGS. 9A and 9B.)

Referring now specifically to FIG. 9B, responsive to finding the busiest CPU within the busiest domain, process 900 identifies whether additional tasks are held on the busiest CPU (step 916). Responsive to determining that no additional tasks are held on the busiest CPU ("no" at step 916), process 900 goes to step 924 where it tries to find the next busiest CPU within the busiest domain. This additional step 924 as well as step 926 may not be present in the native Unix-like operating system scheduler's load balancer implementation. In case of native implementation, process 900 directly goes back to step 908 after skipping steps 924 and 926.

Responsive to determining the next busiest CPU within the busiest domain ("yes" at step 924), the process goes back to step 916 where it iterates through all tasks within this CPU.

Returning now to step 924, if all CPUs have been iterated and there are no more CPUs within the busiest domain, ("no" at step 924), process 900 proceeds to execute sub process "Process SKIPPED_LIST" (step 926). Step 926 is described in detail in FIG. 12. On completion of sub process in step 926, process 900 iterates back to step 908 to sleep for a predefined time period. During this predefined time, the load within various domains may change due to task execution and reallocation. Process 900 then iterates back to step 902 to continue monitoring the various domains.

Returning now to step 916, responsive to finding the next available task within the busiest CPU, ("yes" at step 916), process 900 picks the next busiest task within the CPU (step 918).

Process 900 then determines if the fairness weight of the task identified in step 918 is greater than the load difference between its domain and the busiest domain (step 920).

Responsive to identifying that the fairness weight exceeds the load difference ("yes" in step 920), process 900 ignores the task (step 922) and iterates back to step 916 where it picks the next task and proceeds through the loop. Basically, steps 916, 918 and 920 iterate through all available tasks in the busiest CPU to find the right task to pull to its own domain in an attempt to balance the load. The new enhancements in step 924 allow the loop to iterate through all CPUs within the busiest domain hi decreasing order of their load.

Now returning to step 920, after finding a suitable task with a fairness weight less than the load difference between domains ("no" at step 920), process 900 attempts to add the candidate tasks for reallocation between cores to the skipped list data structure (step 928). The detailed steps for attempts to add the candidate tasks for reallocation between cores to the skipped list data structure is described in FIG. 11. A determination is made as to whether the sub-process in step 928 is successful (step 930). If the sub-process is successful ("yes" at step 930), process 900 iterates back to step 916 to pick the next task. In the native Unix-like operating system scheduler's load balancer implementation, steps 928 and 930 are not present. Hence, after finding a suitable task with fairness weight less than the load difference, process 900 directly proceeds to pull the identified task into its own domain.

Returning now to step 930, on failure of sub process 928 ("no" at step 930), process 900 proceeds to pull the identified task to its own CPU (step 932) in an attempt to balance the load between the busiest domain and its own domain.

Process 900 then updates the load difference (step 934) by subtracting the load of the task that was just moved from the busiest domain.

Process 900, then compares if the load difference is greater than fairness imbalance threshold (step 936). If the load difference is greater than fairness imbalance threshold ("yes" at step 936), process 900 iterates back to step 916 to find the next available task to reduce the load difference.

Returning back to step 936, in response to the load difference becoming less than or equal to fairness imbalance threshold ("no" at step 936), process 900 iterates back to step 908 to sleep for a predefined time period. During this predefined time, load within various domains may change due to task execution and reallocation. Process 900 then iterates back to step 902 to continue monitoring the various domains.

The series of steps from 902 to 936 are the Unix-like operating system scheduler's load balancer with specific enhancements like step 902, 924, 926, 928 and 930 in order to implement the memory and CPU pressure based balancing as an illustrative embodiment.

Figure 10:
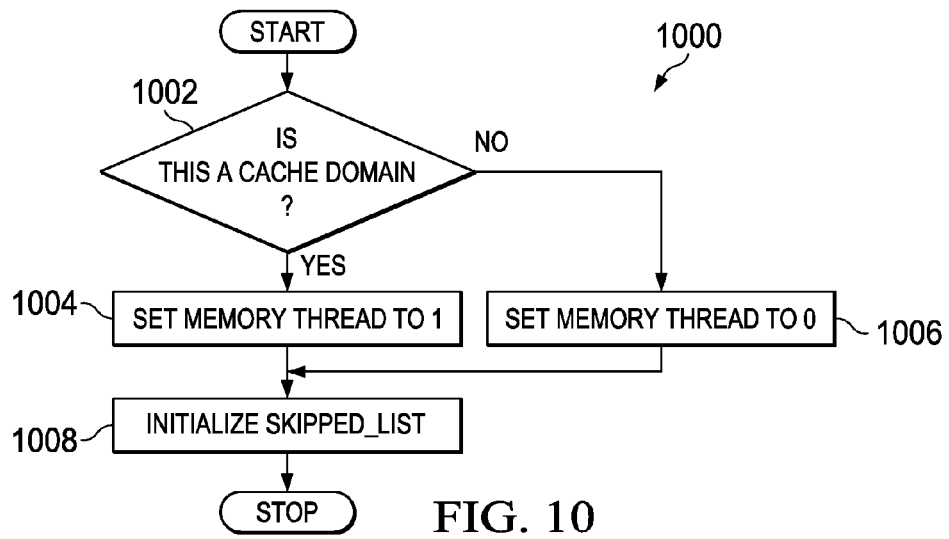
FIG. 10 is a flowchart for initializing a skipped list according to an illustrative embodiment.

Now referring to FIG. 10, a flowchart for initializing a skipped list is shown according to an illustrative embodiment. Process 1000 for initializing the skipped list is a more detailed flowchart of process step 902 of FIG. 9A for initializing a data structure called that is used to store candidate tasks for reallocation between cores.

Process 1000 executes the sub-process "Initialize SKIPPED_LIST" at step 902 of FIG. 9A. Process 1000 begins by determining if the domain being processed for load balancing is a cache domain (step 1002).

Responsive to determining that the domain being processed is a cache domain ("yes" at step 1002), process 1000 sets the flag "Memory Thread" to 1 (step 1004). This setting is used later to ensure that the load balancer thread does not undo the balancing achieved by a memory pressure thread, such as for example, memory pressure thread 724 or memory pressure thread 728 in FIG. 7).

Process 1000 then initializes an empty list data structure called "SKIPPED_LIST" (step 1008) that will be used to store candidate tasks for reallocation between cores.

Now returning to step 1002, responsive to determining that the load balancing domain is not a cache domain, ("no" at step 1002), process 1000 sets the flag "Memory Thread" to zero (step 1006). This setting is used later to ensure that the load balancer thread does not undo the balancing achieved by the CPU pressure thread, such as for example, CPU pressure thread 722 and CPU pressure thread 726 in FIG. 7).

Process 1000 then initializes the data structure that is used to store candidate tasks for reallocation between cores (step 1008) with the process terminating thereafter. Upon completion of process 1000, process 900 continues at step 904.

Figure 11:
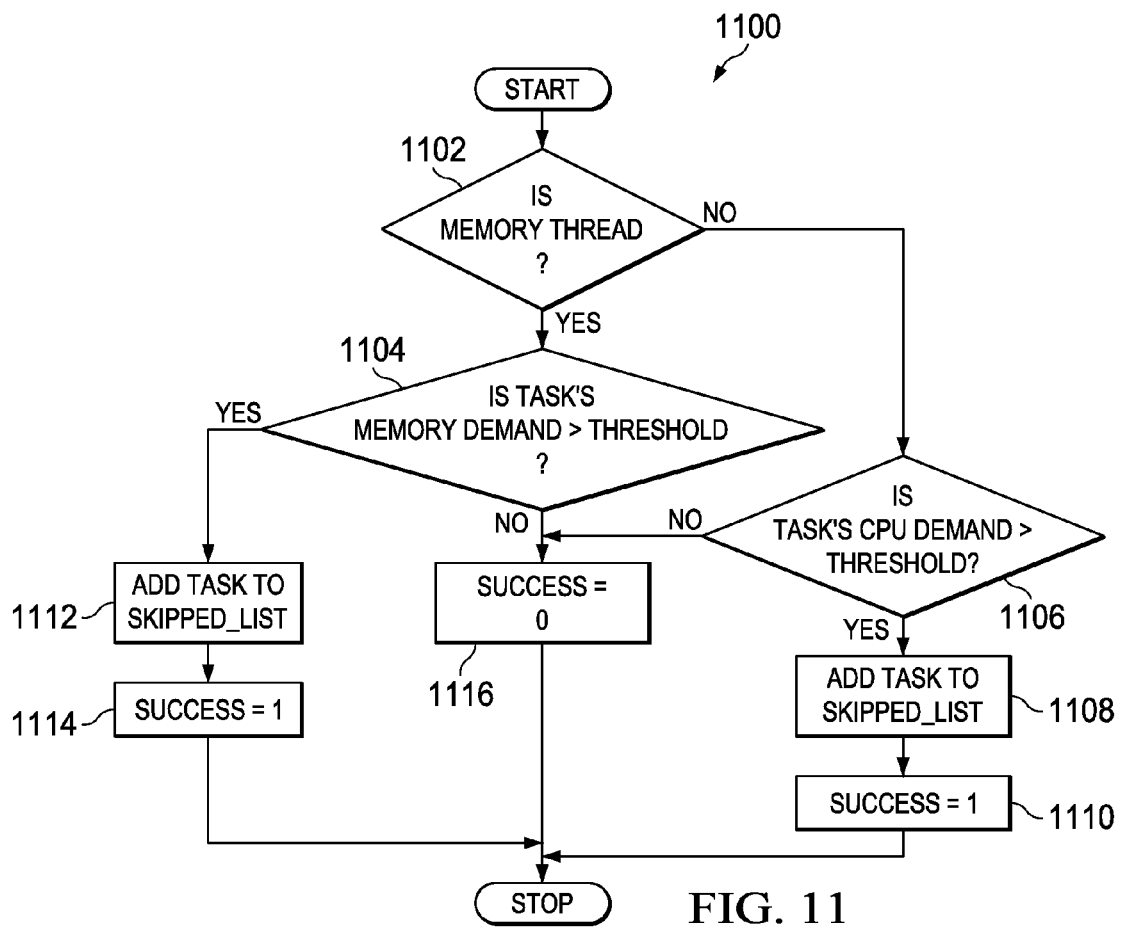
FIG. 11 is a process for adding a candidate process to the skipped list according to an illustrative embodiment.

Now referring to FIG. 11, a process for adding a candidate process to the skipped list is shown according to an illustrative embodiment. Process 1100 for adding processes to the skipped list is a more detailed flowchart of process step 928 of FIG. 9 for adding a candidate process to the skipped list data structure used to store candidate tasks for reallocation between cores. Process 1100 executes the sub-process "ADD to SKIPPED_LIST" at step 928 of FIG. 9B.

Process 1100 begins by checking if the load balancing thread is running as part of a cache domain or a CPU domain (step 1102). In one illustrative embodiment, process 1100 makes this check based on the "Memory Thread" flag that was set in step 1004 or 1006 of FIG. 10 which was determined in step 1002 of FIG. 10. In one illustrative embodiment, the load balancing thread is running as part of a cache domain if the "Memory Thread" flag that was set in step 1004 or 1006 of FIG. 10 is set to "1." In one illustrative embodiment, the load balancing thread is running as part of a CPU domain if the "Memory Thread" flag that was set in step 1004 or 1006 of FIG. 10 is set to "0."

Responsive to determining that the load balancer thread is running as part of a cache domain ("cache" in step 1102), process 1100 checks if the current task's memory demand exceeds the memory demand threshold (step 1104). The memory demand threshold can be memory demand threshold 734 of FIG. 7. Responsive to the task's memory demand exceeding the memory demand threshold ("yes" at step 1104), process 1100 then adds the task to the SKIPPED_LIST (step 1112). The skipped list is the data structure that is used to store candidate tasks for reallocation between cores that was initialized in step 1008 of FIG. 10.

Process 1100 then sets the success flag indicating that the task was successfully added to the skipped list (step 1114), with the process terminating thereafter. In one illustrative embodiment, process 1100 sets the success flag to "one," indicating that the task was successfully added to the skipped list. Upon completion of process 1100, process 900 continues at step 930.

Now, returning to step 1104, responsive to determining that the task's memory demand does not exceed the memory threshold, ("no" at step 1104), process 1100 then sets the success flag indicating that the task was not successfully added to the skipped list (step 1116), with the process terminating thereafter. In one illustrative embodiment, process 1100 sets the success flag to "zero," indicating that the task was not successfully added to the skipped list. Upon completion of process 1100, process 900 continues at step 930.

Returning to step 1102, responsive to determining that the load balancer thread is running as part of a CPU domain ("no" at step 1102), process 1100 then checks if the current task's CPU demand exceeds the CPU demand threshold (step 1106). The CPU demand threshold can be CPU demand threshold 736 of FIG. 7. Responsive to task's CPU demand exceeding CPU demand threshold ("yes" in step 1106), process 1100 then adds the task to the SKIPPED_LIST (step 1108). The skipped list is the data structure that is used to store candidate tasks for reallocation between cores that was initialized in step 1008 of FIG. 10.

Process 1100 then sets the success flag indicating that the task was successfully added to the skipped list (step 1110), with the process terminating thereafter. In one illustrative embodiment, process 1100 sets the success flag to "one," indicating that the task was successfully added to the skipped list. Upon completion of process 1100, process 900 continues at step 930.

Now returning to step 1106, responsive to determining that the task's CPU demand does not exceed the CPU demand threshold ("no" at step 1106), process 1100 then sets the success flag indicating that the task was not successfully added to the skipped list (step 1116), with the process terminating thereafter. In one illustrative embodiment, process 1100 sets the success flag to "zero," indicating that the task was not successfully added to the skipped list. Upon completion of process 1100, process 900 continues at step 930.

Figure 12:
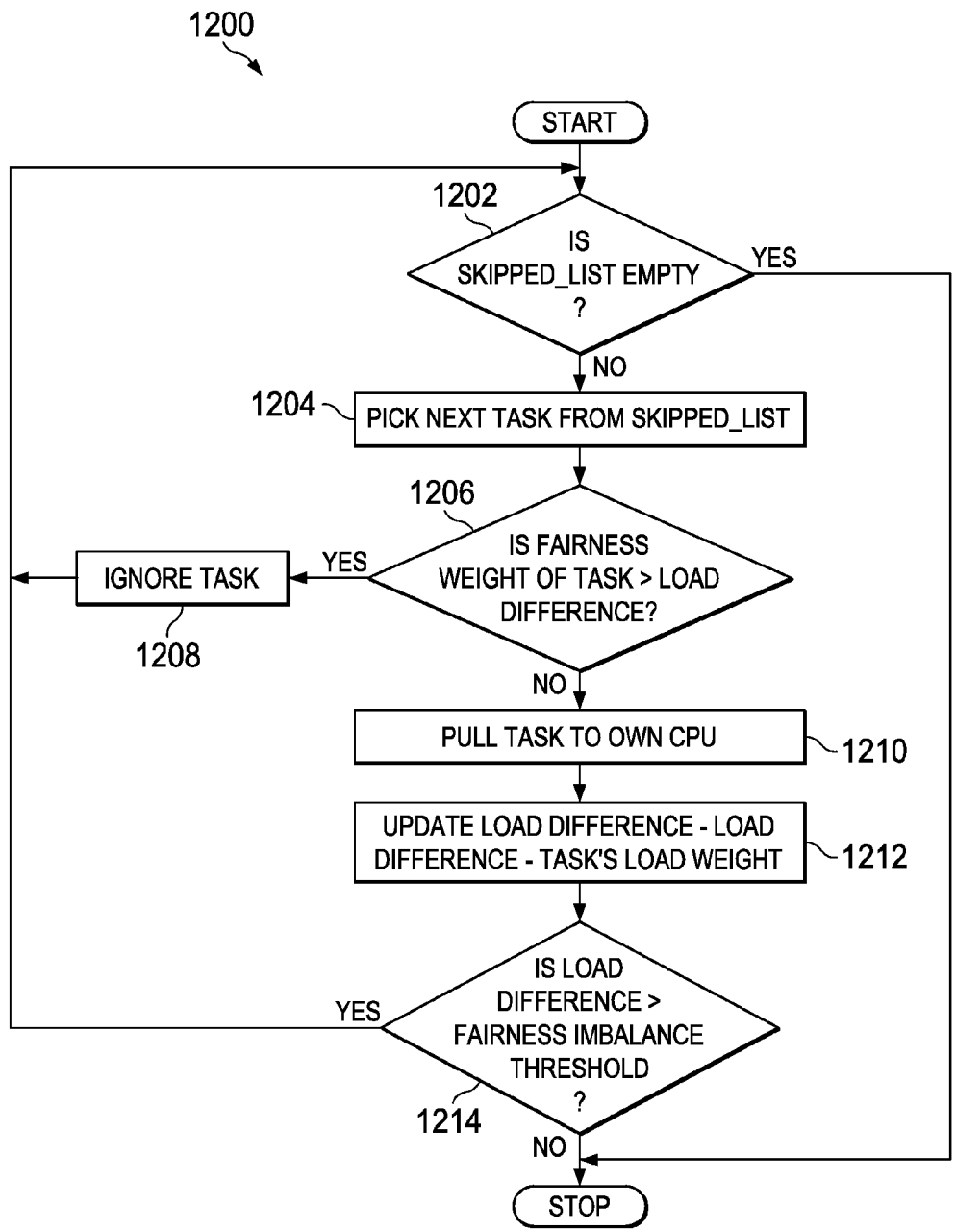
FIG. 12 is a process for processing a candidate process on skipped list according to an illustrative embodiment.

Now referring to FIG. 12, a process for processing a candidate process on a skipped list is shown according to an illustrative embodiment. Process 1200 for processing the skipped list is a more detailed flowchart of process step 926 of FIG. 9B for processing the skipped list data structure used to store candidate tasks for reallocation between domains. Process 1200 executes the sub-process "PROCESS SKIPPED_LIST" at step 926 of FIG. 9B.

Process 1200 begins by checking if the SKIPPED_LIST is empty (step 1202). Responsive to determining a non-empty SKIPPED_LIST ("no" at step 1202), process 1200 picks the next task from the SKIPPED_LIST (step 1204).

Process 1200 then determines if the fairness weight of the task is greater than the load difference (step 1206). Responsive to the fairness weight exceeding the load difference ("yes" at step 1206), process 1200 ignores the task (step 1208) and iterates back to step 1202 to pick the next task in the SKIPPED_LIST.

Now returning to step 1206, responsive to the task's fairness weight not exceeding the load difference between its own domain and busiest domain ("no" at step 1206), process 1200 pulls the task to its own CPU (step 1210). Process 1200 then updates load difference (step 1212) by subtracting the load weight of the task that was just moved in step 1210.

Process 1200 then checks if the load difference is greater than fairness imbalance threshold (step 1214). Responsive to the load difference being greater than fairness imbalance threshold ("yes" at step 1214), process 1200 proceeds back to step 1202 to pick the next task in the SKIPPED_LIST.

Returning now to step 1214, responsive to the load difference not being greater than fairness imbalance threshold ("no" at step 1214), process 1200 terminates. Upon completion of process 1200, process 900 continues at step 908.

Returning to step 1202, responsive to determining an empty SKIPPED_LIST ("yes" at step 1202), process 1200 terminates. Upon completion of process 1200, process 900 continues at step 908.

Thus, illustrative embodiments of the present invention provide a system and method for optimizing task placement during runtime without programming queues regarding the relative memory-hungry or CPU-hungry nature of the various tasks. A runtime optimization scheme for task placement in a multi-core system is shown, taking into account the hardware resource sharing aspects of the various CPUs, as well as the characteristics of tasks with respect to their resource demand and usage. The runtime optimization scheme is performed without programming queues regarding the characteristics of the tasks. Furthermore, the runtime optimization scheme is performed without adversely affecting other goals of task placement, such as for example, but not limited to, fair execution time for all tasks, and reduced power consumed in executing tasks.

A computer implemented method influences task placement within a multiple processor computer. Tasks are classified as either memory bound or CPU bound by observing certain performance counters over the task execution. During a first pass of task load balance, tasks are balanced across various CPUs to achieve a fairness goal, where tasks are allocated CPU resources in accordance to their established fairness priority value. During a second pass of task load balance, tasks are rebalanced across CPUs to reduce CPU resource contention, such that the rebalance of tasks in the second pass does not violate fairness goals established in the first pass. In one embodiment, the second pass could involve re-balancing memory bound tasks across different cache domains, where CPUs in a cache domain share a same last mile CPU cache such as an L3 cache. In another embodiment, the second pass could involve re-balancing CPU bound tasks across different CPU domains of a cache domain, where CPUs in a CPU domain could be sharing some or all of CPU execution unit resources. The two passes could be executed at different frequencies.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer implemented method for influencing task placement within a multiple processor computer, the computer implemented method comprising:
   identifying a first set of tasks executing on a first CPU domain having a first cache domain, the first set of tasks utilizing a first set of resources;
   determining a memory demand for the first set of tasks;
   responsive to determining that the memory demand for a first task of the first set of tasks exceeds a memory demand threshold, classifying the first task as a memory bound task;
   maintaining a first memory hog queue for the first cache domain, wherein the first memory hog queue includes each task of the first set of tasks that is classified as a memory bound task;
   identifying a second set of tasks executing on the second CPU domain having a second cache domain, the second set of tasks utilizing a second set of resources;
   determining a memory demand for the second set of tasks;
   responsive to determining that the memory demand for a second task of the second set of tasks exceeds a memory demand threshold, classifying the second task as a memory bound task;
   maintaining a second memory hog queue for the second cache domain, wherein the second memory hog queue includes each task of the second set of tasks that is classified as a memory bound task; and
   rebalancing the first set of tasks and the second set of tasks to reduce contention for the first set of resources and the second set of resources among the first set of tasks and the second set of tasks, wherein the step of rebalancing the first set of tasks and the second set of tasks further comprises rebalancing memory bound tasks of the first set of tasks to the second CPU domain to reduce contention between the first set of tasks for the first cache domain.

2. The computer implemented method of claim 1, wherein the step of rebalancing the first set of tasks and the second set of tasks further comprises:
   rebalancing CPU bound tasks of the first set of tasks to the second CPU domain to reduce contention between the first set of tasks for the first CPU domain, and combinations thereof.

3. The computer implemented method of claim 2, further comprising:
   determining a CPU demand for the first set of tasks; and
   responsive to determining that the CPU demand for the first task of the first set of tasks exceeds a CPU demand threshold, classifying the first task as a CPU bound task.

4. The computer implemented method of claim 3, wherein the step of determining the CPU demand further comprises identifying a cache miss rate in the first cache domain for the first set of tasks;
   and wherein the step of determining the CPU demand further comprises identifying a number of instructions retired by the first CPU domain for the first set of tasks.

5. The computer implemented method of claim 3, further comprising:
   maintaining a first CPU hog queue for the first CPU domain, wherein the first CPU hog queue includes tasks of the first set of tasks that are classified as CPU bound tasks; and
   maintaining a second CPU hog queue for the second CPU domain, wherein the second memory hog queue includes tasks of the second set of tasks that are classified as CPU bound tasks.

6. A computer storage medium having a computer program product encoded thereon for influencing task placement within a multiple processor computer, the computer storage medium comprising:
   instructions for identifying a first set of tasks executing on a first CPU domain having a first cache domain, the first set of tasks utilizing a first set of resources;

instructions for determining a memory demand for the first set of tasks;
instructions, responsive to determining that the memory demand for a first task of the first set of tasks exceeds a memory demand threshold, for classifying the first task as a memory bound task;
instructions for maintaining a first memory hog queue for the first cache domain, wherein the first memory hog queue includes each task of the first set of tasks that is classified as a memory bound task;
instructions for identifying a second set of tasks executing on the second CPU domain having a second cache domain, the second set of tasks utilizing a second set of resources;
instructions for determining a memory demand for the second set of tasks;
instructions, responsive to determining that the memory demand for a second task of the second set of tasks exceeds a memory demand threshold, for classifying the second task as a memory bound task;
instructions for maintaining a second memory hog queue for the second cache domain, wherein the second memory hog queue includes each task of the second set of tasks that is classified as a memory bound task; and
instructions for rebalancing the first set of tasks and the second set of tasks to reduce contention for the first set of resources and the second set of resources among the first set of tasks and the second set of tasks, wherein the instructions for rebalancing the first set of tasks and the second set of tasks further comprises instructions for rebalancing memory bound tasks of the first set of tasks to the second CPU domain to reduce contention between the first set of tasks for the first cache domain.

7. The computer storage medium of claim 6, wherein the instructions for rebalancing the first set of tasks and the second set of tasks further comprises:
instructions for rebalancing CPU bound tasks of the first set of tasks to the second CPU domain to reduce contention between the first set of tasks for the first CPU domain, and combinations thereof.

8. The computer storage medium of claim 7, further comprising:
instructions for determining a CPU demand for the first set of tasks; and
instructions, responsive to determining that the CPU demand for the first task of the first set of tasks exceeds a CPU demand threshold, for classifying the first task as a CPU bound task.

9. The computer storage medium of claim 8, wherein the instructions for determining the CPU demand further comprises identifying a cache miss rate in the first cache domain for the first set of tasks;
and wherein the instructions for determining the CPU demand further comprises identifying a number of instructions retired by the first CPU domain for the first set of tasks.

10. The computer storage medium of claim 8, further comprising:
instructions for maintaining a first CPU hog queue for the first CPU domain, wherein the first CPU hog queue includes tasks of the first set of tasks that are classified as CPU bound tasks; and
instructions for maintaining a second CPU hog queue for the second CPU domain, wherein the second memory hog queue includes tasks of the second set of tasks that are classified as CPU bound tasks.

11. A data processing system comprising:
a memory having a computer program product encoded thereon for influencing task placement within a multiple processor computer;
a bus system connecting the memory to a processor; and
a processor, wherein the processor executes the computer program product:
to identify a first set of tasks executing on a first CPU domain having a first cache domain, the first set of tasks utilizing a first set of resources;
to determine a memory demand for the first set of tasks;
responsive to determining that the memory demand for a first task of the first set of tasks exceeds a memory demand threshold, to classify the first task as a memory bound task;
to maintain a first memory hog queue for the first cache domain, wherein the first memory hog queue includes each task of the first set of tasks that is classified as a memory bound task;
to identify a second set of tasks executing on the second CPU domain having a second cache domain, the second set of tasks utilizing a second set of resources;
to determine a memory demand for the second set of tasks;
responsive to determining that the memory demand for a second task of the second set of tasks exceeds a memory demand threshold, to classify the second task as a memory bound task;
to maintain a second memory hog queue for the second cache domain, wherein the second memory hog queue includes each task of the second set of tasks that is classified as a memory bound task; and
to rebalance the first set of tasks and the second set of tasks to reduce contention for the first set of resources and the second set of resources among the first set of tasks and the second set of tasks, wherein the processor executing the computer program product to rebalance the first set of tasks and the second set of tasks further comprises the processor executing the computer program product to rebalance memory bound tasks of the first set of tasks to the second CPU domain to reduce contention between the first set of tasks for the first cache domain.

12. The data processing system of claim 11, wherein the processor executing the computer program product to rebalance the first set of tasks and the second set of tasks further comprises:
the processor executing the computer program product to rebalance CPU bound tasks of the first set of tasks to the second CPU domain to reduce contention between the first set of tasks for the first CPU domain, and combinations thereof.

13. The data processing system of claim 12, wherein the processor further executes the computer program product:
to determine a CPU demand for the first set of tasks; and
responsive to determining that the CPU demand for the first task of the first set of tasks exceeds a CPU demand threshold, to classify the first task as a CPU bound task.

14. The data processing system of claim 13, wherein the processor executing the computer program product to determine the CPU demand further comprises the processor executing the computer program product to identify a cache miss rate in the first cache domain for the first set of tasks;
and wherein the processor executing the computer program product to determine the CPU demand further comprises wherein the processor executing the computer program product to identify a number of instructions retired by the first CPU domain for the first set of tasks.

15. The data processing system of claim 13, wherein the processor further executes the computer program product:
- to maintain a first CPU hog queue for the first CPU domain, wherein the first CPU hog queue includes tasks of the first set of tasks that are classified as CPU bound tasks; and
- to maintain a second CPU hog queue for the second CPU domain, wherein the second memory hog queue includes tasks of the second set of tasks that are classified as CPU bound tasks.

16. A computer implemented method for influencing task placement within a multiple processor computer, the computer implemented method comprising:
- identifying a busiest domain from a plurality of domains, wherein the busiest domain has a greatest pressure of the plurality of domains, wherein the busiest domain is selected from the group consisting of a busiest cache domain, and a busiest CPU domain, wherein the plurality of domains is selected from the group consisting of a plurality of cache domains, and a plurality of CPU domains, wherein the greatest pressure is selected from the group consisting of a greatest memory pressure, and a greatest CPU pressure;
- identifying a pressure difference between the greatest pressure of the busiest domain and a pressure of a second domain of the plurality of domains, wherein the pressure difference is selected from the group consisting of a memory pressure difference and a CPU pressure difference;
- determining whether the pressure difference between is greater than a pressure threshold, wherein the pressure threshold is selected from the group consisting of a memory pressure threshold and a CPU pressure threshold;
- responsive to determining that the memory pressure difference between is greater than a pressure threshold, identifying a set of demands for each of a set of tasks assigned to the busiest domain, wherein the set of demands is selected from the group consisting of a set of memory demands and a set of CPU demands;
- determining whether a particular demand for a particular task is less than a demand threshold, wherein the particular demand is selected from the group consisting of a particular memory demand and a particular CPU demand, and wherein the demand threshold is selected from the group consisting of a memory demand threshold and a CPU demand threshold; and
- responsive to determining that the particular demand for the particular task is not less than the demand threshold, reassigning the particular task to the second domain of the plurality of domains.

17. The computer implemented method of claim 16, further comprising:
- identifying whether the busiest domain is the second domain; and
- responsive to identifying that the busiest domain is not the second domain, identifying the pressure difference between the greatest pressure of the busiest domain and the pressure of the second domain of the plurality of domains.

18. The computer implemented method of claim 16, further comprising:
- responsive to determining that the pressure difference is greater than a pressure threshold, locking a related hog queue for the busiest domain; and
- identifying the set of demands for each of the set of tasks assigned to the busiest domain, wherein the set of tasks assigned to the busiest domain are identified from within the related hog queue for the busiest domain.

19. The computer implemented method of claim 18, wherein the step of reassigning the particular task to the second domain of the plurality of domains further comprises dequeuing the particular task from the busiest domain, and enqueuing the task on the second domain, the computer implemented method further comprising:
- updating the pressure difference between the busiest domain and the second domain; and
- unlocking the related hog queue for the busiest domain.

20. The computer implemented method of claim 18, wherein the step of reassigning the particular task to the second cache domain of the plurality of cache domains further comprises:
- updating a hog list for the busiest domain, wherein the hog list for the busiest domain is a pointer associated with the hog queue for the busiest domain in order to remove the particular task from the hog queue for the busiest domain; and
- updating a hog list for the second domain, wherein the hog list for the second domain is a pointer associated a hog queue for the second domain in order to add the particular task to the hog queue for the second domain.

* * * * *